(12) United States Patent
Pleshachkov et al.

(10) Patent No.: US 12,124,478 B2
(45) Date of Patent: *Oct. 22, 2024

(54) SYSTEM AND METHOD FOR PERSISTENCE AND REPLICATION OF CHANGES TO A DATA STORE

(71) Applicant: Open Text Corporation, Waterloo (CA)

(72) Inventors: Petr Olegovich Pleshachkov, Nootdorp (NL); Valery Maltsev, Delft (NL)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,498

(22) Filed: Feb. 27, 2023

(65) Prior Publication Data
US 2023/0205786 A1 Jun. 29, 2023

Related U.S. Application Data

(63) Continuation of application No. 16/006,562, filed on Jun. 12, 2018, now Pat. No. 11,599,557.

(51) Int. Cl.
*G06F 16/27* (2019.01)
(52) U.S. Cl.
CPC ................. *G06F 16/273* (2019.01)
(58) Field of Classification Search
CPC .................................................. G06F 16/273
See application file for complete search history.

(56) References Cited

U.S. PATENT DOCUMENTS

| | | | | |
|---|---|---|---|---|
| 9,229,864 B1* | 1/2016 | Kanteti | ............... | G06F 12/0868 |
| 10,191,663 B1* | 1/2019 | O'Neill | ................. | G06F 3/0604 |
| 10,795,881 B2* | 10/2020 | Lee | ...................... | G06F 16/2379 |
| 2009/0157766 A1* | 6/2009 | Shen | ................... | G06F 16/2379 |
| 2014/0359341 A1* | 12/2014 | Helmick | ................. | G06F 11/00 |
| | | | | 714/4.11 |
| 2015/0220280 A1* | 8/2015 | Ishizaki | ................ | G06F 3/0619 |
| | | | | 711/114 |
| 2017/0300412 A1* | 10/2017 | Johnson | .............. | G06F 12/0804 |

* cited by examiner

*Primary Examiner* — Mark D Featherstone
*Assistant Examiner* — Ranjit P Doraiswamy
(74) *Attorney, Agent, or Firm* — Sprinkle IP Law Group

(57) ABSTRACT

A database replication system comprises a plurality of replica data nodes and a master data node. The master data node is configured with an acknowledgement requirement that comprises an acknowledgement threshold that is less than a total number of data nodes in a plurality of data nodes. The master data node is configured to send, to the plurality of replica data nodes, a transaction log record that includes an update to data in the master database that has not been committed to the master database, receive acknowledgements of the transaction log records and based on a determination that the received acknowledgements of the transaction log record meet the acknowledgement requirement, set the transaction log record as a master node last acknowledged transaction log record in a master node transaction log. The last acknowledged transaction log record can be used to control recovery.

21 Claims, 18 Drawing Sheets

SYSTEM AND METHOD FOR PERSISTENCE AND REPLICATION OF CHANGES TO A DATA STORE

RELATED APPLICATION(S)

This application is a continuation of, and claims a benefit of priority under 35 U.S.C. 120 of, U.S. patent application Ser. No. 16/006,562 filed Jun. 12, 2018, issued as U.S. Pat. No. 11,599,557, entitled "SYSTEM AND METHOD FOR PERSISTENCE AND REPLICATION OF CHANGES TO A DATA STORE," which is hereby incorporated herein for all purposes.

TECHNICAL FIELD

This disclosure relates generally to persisting and replicating changes to a data store. More particularly, embodiments relate to persistence and replication of changes to a transactional data store.

BACKGROUND

Some existing database management systems (DBMS) record changes for a database to a transaction log on disk before writing the changes to the database. Because the cost of writing to the transaction log is typically less than the cost of writing the change to the database, the use of a transaction log increases the likelihood that a DBMS will capture a change before a system failure. If a system failure does occur, the DBMS can redo or undo changes from the transaction log to recover the database up to the end of the transaction log.

High-availability systems may also use transaction logs to replicate changes from a source database to target databases. More particularly, replication of a source database may be achieved by copying a source database from a source database system to target database systems and subsequently sending the source database's transaction log records to the target database systems to propagate the on-going changes from the source database to the target databases. To ensure that changes are persisted at the target database systems before, the source database system, in some implementations, will not complete commit processing of a transaction until all the changes made by the transaction have been stored in the transaction logs of all the target database systems. This ensures that the target databases can be fully recovered to the state of the source database.

Propagating transaction log records from a source database system to each target database system and confirming that the transaction log records have been successfully stored at each target database system can take a significant amount of time, particularly when there are many copies of a database. This can cause a delay in commit processing at the source database system and result in serious performance impacts on an overall system that writes to the source database. For example, an application server that is a client of the source database system may experience significant delays between submitting a transaction and being able to serve a page to a user indicating that user submitted data has been successfully stored. In turn, the user may experience significant latency between submitting data and receiving a response from the application server that the data was successfully stored.

Moreover, failure of any of the target database systems causes the source database system to stop commit processing of a transaction. Failure of a single copy of the database can make a high-availability system essentially a read-only system until the failed target database system is restored or the high-availability system reconfigured to exclude the failed target database system.

SUMMARY

One embodiment includes a database replication system that comprises a plurality of data nodes, each data node in the plurality of data nodes comprising a processor and a memory. The plurality of data nodes includes a plurality of replica data nodes and a master data node. The master data node comprises a master database and each replica data node of the plurality of replica data nodes comprises a replica database. The master data node is configured with an acknowledgement requirement that comprises an acknowledgement threshold that is less than a total number of replica data nodes in the plurality of replica data nodes.

The master data node is configured to send, to the plurality of replica data nodes, a transaction log record that includes an update to data in the master database that has not been committed to the master database. More particularly, according to one embodiment, the master data node may be configured to maintain a master node transaction log in persistent memory, write the transaction log record from master data node volatile memory to the master node transaction log in persistent memory and send the transaction log record to the plurality of replica data nodes after writing the transaction log record to the master node transaction log. The master data node can be configured, for example, to send the transaction log record to each replica data node in a replication group. The replication group may include replica data nodes at different data centers.

The master data node may write the transaction log record from the master node volatile memory to the transaction log in persistent memory based on a synchronization call, respond to the synchronization call based on receiving the acknowledgements of the transaction log record from at least the acknowledgement threshold of replica data nodes of the plurality of replica data nodes.

The master data node is further configured to receive acknowledgements of the transaction log records. Based on a determination that the received acknowledgements of the transaction log record meet the acknowledgement requirement, the master data node can set the transaction log record as a master node last acknowledged transaction log record in a master node transaction log. The master data node can be configured to determine that the received acknowledgements of the transaction log record meet the acknowledgement requirement based on a determination that the received acknowledgements of the transaction log record include replica data node acknowledgement of the transaction log record from at least the acknowledgement threshold of replica data nodes from the plurality of replica data nodes.

The master data node can be configured to send an identification of the master node last acknowledged transaction log record to the plurality of replica data nodes. The master node last acknowledged log record indicates a last redo transaction log record for startup recovery of a replica data node.

Each replica data node of the plurality of replica data nodes can be configured to maintain a replica node transaction log for that replica data node. The replica node transaction log for each replica data node of the plurality of replica data nodes can be configured to hold transaction log records received by that replica data node. Each replica data node of the plurality of replica data nodes can further be configured to send a recovery request to the master data node for a set of transaction log records subsequent to a replica data node last acknowledged transaction log record for that replica data node. Each replica data node of the plurality of replica data nodes can be configured to request, in the recovery request, the set of transaction log records from the replica node last acknowledged transaction log record for that replica data node to the master last acknowledged transaction log record.

The plurality of replica data nodes can be configured to elect a new master data node from the plurality of replica data nodes based on detecting that the master data node is not operating.

Another embodiment includes a computer program product comprising a non-transitory computer readable medium storing a set of computer instructions executable by a processor to send a transaction log record to a plurality of replica data nodes, the transaction log record comprising an update to data in a master database that has not been committed to the master database. More particularly, according to one embodiment, a master data node may be configured to maintain a master node transaction log in persistent memory, write the transaction log record from master data node volatile memory to the master node transaction log in persistent memory and send the transaction log record to the plurality of replica data nodes after writing the transaction log record to the master node transaction log.

The computer instructions may further be executable to receive, by the master data node, acknowledgements of the transaction log records at the master data node and set, by the master data node, the transaction log record as a master node last acknowledged transaction log record in a master node transaction log based on a determination that the received acknowledgements of the transaction log record meet an acknowledgement requirement that comprises an acknowledgement threshold that is less than a total number of replica data nodes in the plurality of data nodes. The master node last acknowledged log record can indicate a last redo transaction log record for startup recovery of the master data node or a replica data node. The computer instructions may further be executable by the processor to send, by the master data node, the transaction log record to each data node in a replication group. The replication group may be spread across multiple data centers.

The computer instructions can be executable by the processor to determine that the received acknowledgements of the transaction log record meet the acknowledgement requirement based on a determination that the received acknowledgements of the transaction log record include replica data node acknowledgements of the transaction log record from at least the acknowledgement threshold of replica data nodes from the plurality of replica data nodes.

The computer instructions can further be executable by the processor to receive, by the master data node, a recovery request from a replica data node of the plurality of replica data nodes for a set of transaction log records subsequent to a replica data node last acknowledged transaction log record for the replica data node. According to one embodiment, the set of transaction log records comprises transaction log records from the replica data node last acknowledged transaction log record for the replica data node to the master data node last acknowledged transaction log record.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories (RAMs), read-only memories (ROMs), hard drives (HDs), data cartridges, direct access storage device arrays, magnetic tapes, floppy diskettes, flash memory drives, optical data storage devices, compact-disc read-only memories, hosted or cloud-based storage, and other appropriate computer memories and data storage devices.

Embodiments described herein provide systems and methods for persisting and replicating changes to a data store. Embodiments further include systems and methods for recovering data stores. Embodiments also provide systems and methods for automatic failover in the event of failure.

Figure 1:
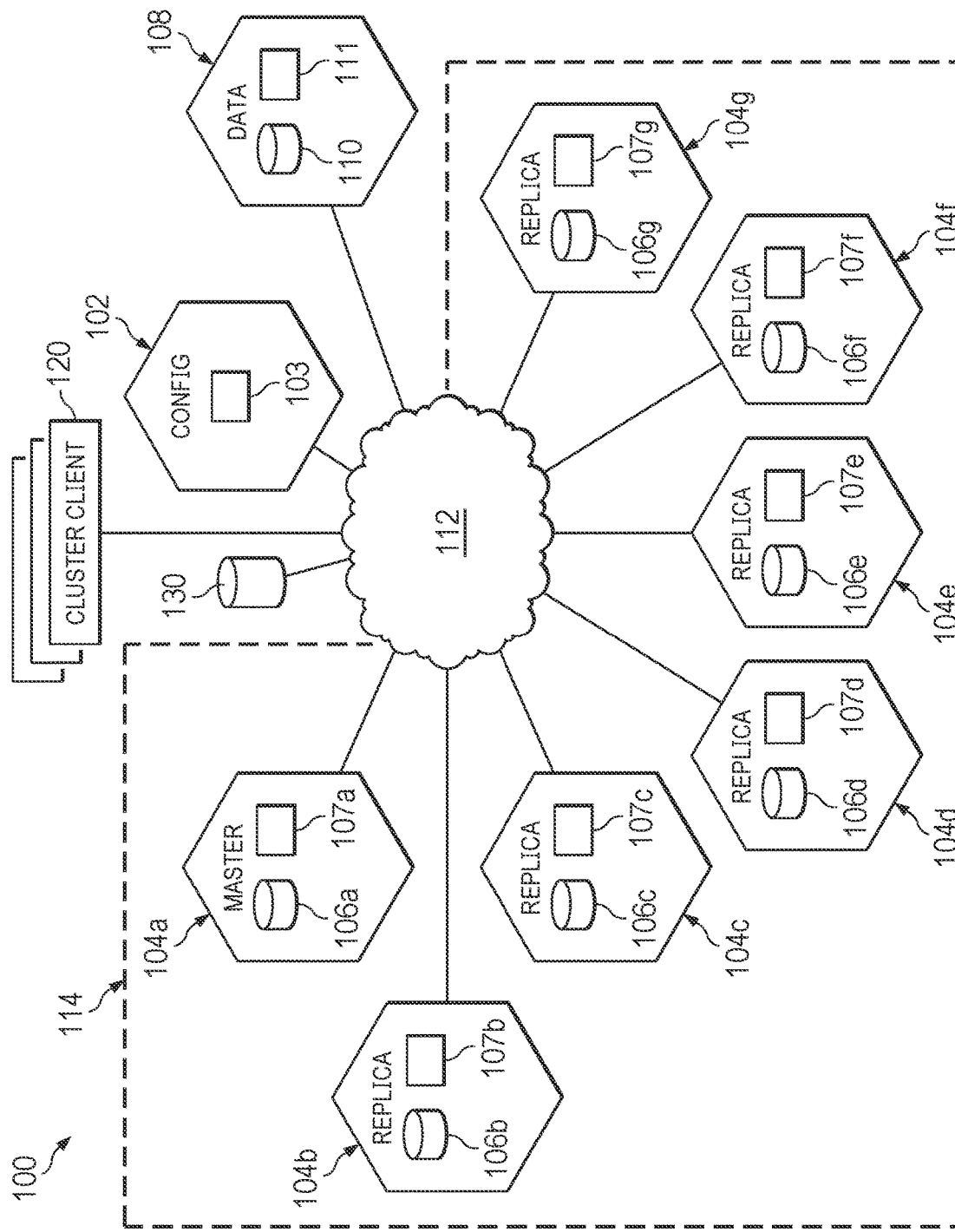
FIG. 1 is a diagrammatic representation of one embodiment of a cluster architecture.

FIG. 1 is a diagrammatic representation of one embodiment of a cluster architecture that includes a data storage cluster 100 and cluster clients 120 that can communicate with cluster 100 to request and modify data stored in cluster 100. Cluster 100 includes a configuration node 102, data node 104a, data node 104b, data node 104c, data node 104d, data node 104e, data node 104f, data node 104g and data node 108. The cluster architecture may further include a shared storage 130, such as a shared namespace, accessible by data node 104a, data node 104b, data node 104c, data node 104d, data node 104e, data node 104f, data node 104g. The nodes of cluster 100 and cluster clients 120 are bi-directionally coupled by a network 112.

According to one embodiment, each data node of cluster 100 acts as a separate server that listens for and can accept incoming requests from other components of the cluster architecture. Each data node maintains a data store, such as a database, file system, or combination thereof or other data store. For example, in the illustrated embodiment, node 104a maintains data store 106a, data node 104b maintains data store 106b, data node 104c maintains data store 106c, data node 104d maintains data store 106d, data node 104e maintains data store 106e, data node 104f maintains data store 106f, data node 104g maintains data store 106g and data node 108 maintains data store 110.

Data nodes 104a, 104b, 104c, 104d, 104e, 104f, 104g and 108 may manage data from data stores 106a, 106b, 106c, 106d, 106e, 106f, 106g, 110, respectively, as pages—that is, fixed size blocks of contiguous data that can be read into volatile memory. Each data node can include a buffer pool in volatile memory to store volatile versions of pages (referred to as a "page buffer" herein). A data node transfers pages from the nonvolatile storage version of the data store to the page buffer and transfers pages from the page buffer to the nonvolatile storage version of the data store (e.g., the persistent database, filesystem or other data store). For a read operation by a cluster client 120, the data node processing the read operation provides pages to the cluster client 120 from the data node's page buffer. If a data node is configured to allow write access by a cluster client 120 to the data node's data store, the data node first performs updates by the client to the page on in the data node's page buffer. A page in a data node's page buffer is considered dirty if it contains changes that are not reflected in the non-volatile storage version of the same page in the data node's persistent data store. To update its persistent version of a data store to implement a change by the cluster client 120, the data node 104a, 104b, 104c, 104d, 104e, 104f, 104g, 108 writes the dirty page from its page buffer to its non-volatile storage version of the data store 106a, 106b, 106c, 106d, 106e, 106f, 106g, 108, respectively.

Operations cluster clients 120 to change data in a data store 106a, 106b, 106c, 106d, 106e, 106f, 106g, 110, may be processed based on a transactional model. Transactions are well-known in data storage and, while most commonly used with respect to databases, are not limited to databases. In general, a transaction is a set of one or more operations that is treated as a single unit of work by a data node. As one skilled in the art will appreciate, transactions may comply with the ACID properties of atomicity, consistency, isolation and durability.

Each data node can maintain a transaction log. In the illustrated embodiment, node 104a maintains transaction log 107a, data node 104b maintains transaction log 107b, data node 104c maintains transaction log 107c, data node 104d maintains transaction log 107d, data node 104e maintains transaction log 107e, data node 104f maintains transaction log 107f, data node 104g maintains transaction log 107g. Data node 108 may also store a transaction log 111. Transaction logs can help promote atomicity and durability in the face of concurrent execution of multiple transactions and various failures. For example, a transaction log may be used to redo changes if a data node fails before a transaction is successfully committed to the persistently stored version of a data store or, in some embodiments, undo changes to the persistently stored version of the data store if the data node fails during an unfinished transaction.

Data nodes 104a, 104b, 104c, 104d, 104e, 104f, 104g, 108 may each operate in various modes of operation, such as a standalone data node, a master data node or a replica data node. In certain modes of operation, a data node 104a, 104b, 104c, 104d, 104e, 104f, 104g, 108 may allow cluster clients 120 to perform write operations on the respective data store 106a, 106b, 106c, 106d, 106e, 106f, 106g, 110 (referred to as a "write-enabled data node" herein) and in other modes of operation may not allow cluster clients 120 to perform write operations on the respective data store 106a, 106b, 106c, 106d, 106e, 106f, 106g, 110 (referred to herein as "read-only data node"). A write-enabled data node may implement write ahead logging (WAL). Utilizing WAL, a write-enabled data node 104a, 104b, 104c, 104d, 104e, 104f, 104g, 108 writes changes by transactions to a persistent transaction log 107a, 107b, 107c, 107d, 107e, 107f, 107g, 111 before completing commit processing of the transactions. One example of transaction logging is described in ARIES: A Transaction Recovery Method Supporting Fine-Granularity Locking and Partial Rollbacks Using Write-Ahead Logging, by Mohan, ACM Transactions on Database Systems, Vol. 17, No. 1, March 1992, Pages 94-162 ("ARIES"), which is hereby fully incorporated by reference herein for all purposes.

According to one embodiment, a write-enabled data node does not write dirty pages modified by a transaction to the respective data store 106a, 106b, 106c, 106d, 106e, 106f, 106g, 110 at least until the transaction commits—that is, the transaction indicates that data modifications performed by the transaction since the start of the transaction are to be persistently stored as part of the data store. In other embodiments, a write-enabled data node 104a, 104b, 104c, 104d, 104e, 104f, 104g, 108 may write dirty pages that are modified by a transaction to the respective persistent data store 106a, 106b, 106c, 106d, 106e, 106f, 106g, 110 before the transaction commits, but does not complete commit processing of the transaction at least until the transaction commits. In this second case, changes to the data store 106a, 106b, 106c, 106d, 106e, 106f, 106g, 110 by a transaction may have to be undone if the transaction aborts or fails before it commits.

Configuration node 102 stores cluster metadata 103 that defines which data nodes are in cluster 100 and includes information about data nodes in cluster 100, such as the identities and addresses of the data nodes and information about the data stores maintained by each data node. While only one configuration node 102 is illustrated, there may be multiple configuration nodes 102 in a cluster. Each cluster client 120 can be configured to connect to configuration node 102 to discover the data nodes in cluster 100 available to that cluster client 120 and data nodes 104a, 104b, 104c, 104d, 104e, 104f, 104g, 108 in cluster 100 can be configured to connect to configuration node 102 to discover the other data nodes in cluster 100.

The cluster metadata 103 maintained by configuration node 102 may define a replication group of data nodes in cluster 100 to maintain copies of a data set. A replication group comprises a master data node that maintains a master data set and the replica data nodes that maintain replica data sets. For example, the master data node may maintain a master database and the replica data node may maintain replica databases. Changes to the master data set are replicated to the replica data sets. With multiple copies of the same data set on different data nodes in the cluster, the replication group provides a level of fault tolerance against the loss of a single data node. A replication group can provide increased query performance since the system can distribute the queries on the data set over different data nodes of the replication group.

Each data node 104a, 104b, 104c, 104d, 104e, 104f, 104g, 108 can determine that it is part of replication group 114 and its role as a master or replica data node from cluster metadata 103 provided by configuration node 102. In FIG. 1, for example, data nodes 104a, 104b, 104c, 104d, 104e, 104f, 104g, are grouped in replication group 114 with data node 104a acting as the master data node and the others acting as replica data nodes. Thus, in FIG. 1, data store 106a is the master data store and data stores 106b, 106c, 106d, 106e, 106f, 106g, are replica data stores. Each data node 104a, 104b, 104c, 104d, 104e, 104f, 104g in replication group maintains a list of the other replica data nodes in the replication group and addressing information for the other data nodes in the replication group (e.g., based on cluster metadata 103 provided by configuration node 102). According to one embodiment, cluster client 120 is permitted to read data from and change data in master data store 106a, but only read data from replica data stores 106b, 106c, 106d, 106e, 106f, 106g. In other words, the master data node 104a is the only write-enabled data node in the replication group 114. Data node 108 is a standalone data node as it is not part of a replication group.

Master data node 104a may implement WAL as discussed above. To this end, master data node 104a can record transaction log records for transactions for changing data in data store 106a. In general, the transaction log records for a transaction include update data that describes updates made to pages by the transaction and may further reflect various other parts of the transaction. Consequently, if there is a failure before a dirty page is written from master data node 104a's page buffer to master data store 106a, master data node 104a can use the transaction log records to "replay" the changes or undo changes for unfinished transactions.

As will be appreciated by those in the art, each transaction log record is assigned a unique identifier. For example, each transaction log record may be assigned a log sequence number (LSN) that is a monotonically increasing value that indicates the transaction log record's address relative to a transaction log.

A transaction log record further includes additional data. The additional data can depend on the system implementing the transaction log, the type of transaction log record and other factors. Examples of additional data, include, but are not limited to, an identifier of the transaction (TransID) that generated the transaction log record, an identifier of the preceding log record generated for the same transaction (e.g., PrevLSN indicating the preceding sequence number of the transaction log record generated for the same transaction) or a record type (e.g., update, commit, abort).

A transaction log record reflecting an update to data from data store 106a can include an indicator of the data affected by an update and update data that describes the change. For example, a transaction log record may include an identifier of a page updated by a transaction and update data that describes the update. In some cases, a single transaction log record may include updates to multiple pages. In other embodiments, a log record only includes an update to a single page.

The update data of a transaction log record describes the update to a page and may include redo data or undo data. Redo data describes the change for a page caused by a transaction and the undo data includes data to undo a change to the page caused by a transaction. As those in the art will appreciate, the "redo" and "undo" data may be determined based on updates to pages before the updates have been written to the non-volatile version of the data store. Undo and redo data may specify updates as a bitwise difference in a page.

Master data node 104a first writes transaction log records to a transaction log buffer pool (a "transaction log buffer") in volatile memory. For example, master data node 104a can first write transaction logs to a transaction log buffer in virtual memory. At the occurrence of a predefined event, master data node 104a writes transaction log records, in sequence order, from volatile storage to persistent storage (nonvolatile storage). The process of writing transaction log records from the transaction log buffer in volatile storage to a transaction log in persistent storage is referred to as forcing the log.

Forces of the log from the transaction log buffer to persistent storage may be caused by a variety of events. Examples of defined events that may trigger forcing the transaction log records from the transaction log buffer to the persistent transaction log may include a synchronization call. A synchronization call may be, for example, a signal from a buffer manager that the transaction log buffer is full or a signal from a transaction manager that the master data node 104a has received a transaction commit—that is a command, statement or other indication that indicates that changes since the start of a transaction are to be persistently stored as part of data store 106a. Forcing may include appending the transaction log records to a transaction log file stored on a hard drive or other persistent storage device.

Prior to committing an update to a page to data store 106a, master data node 104a sends the transaction log record containing the update to replica data nodes 104b, 104c, 104d, 104e, 104f, 104g and waits for an acknowledgement. As discussed below, sending an update to the replica data nodes may include sending log records up to a specified log record to the replica data nodes. Master data node 104a is configured with an acknowledgement requirement that sets an acknowledgement threshold of replica data nodes from cluster 100 in the replication group 114 that must acknowledge the transaction log record. The acknowledgement threshold is less than a total number of replica data nodes in the replication group. In one embodiment, the acknowledgement requirement may be based on a quorum, where a quorum is a majority of data nodes in the replication group. For example, the acknowledgement threshold may be threshold=quorum-1 because the master data node is considered acknowledged by definition. Since there are seven data nodes in the replication group 114, quorum-1=3. In this example then, the master data node 104a waits for acknowledgements from at least three of the replica nodes in replica group 114 before committing an update. As another example, if there are nine data nodes in replication group 114, then quorum-1=4 and master data node 104a would wait for at least four acknowledgements. The changes are thus persisted in these examples by at least a quorum of the data nodes: master data node 104a and quorum-1 replica data nodes.

According to one embodiment, master data node 104a delays completing commit processing of a transaction until the transaction is considered complete. Master data node 104a considers a transaction complete when at least all the update data necessary to redo the transaction has been persistently recorded by at least the threshold number of data nodes 104b, 104c, 104d, 104e, 104f, 104g of replication group 114. For example, master data node 104a may not consider a transaction complete until at least the acknowledgement threshold number of replica data nodes 104b, 104c, 104d, 104e, 104f, 104g has acknowledged the transaction log records at least up to the commit transaction log record for the transaction.

In an embodiment in which master data node 104a can write an updated page to master data store 106a before the transaction that modified the page commits, master data node 104a may delay writing the modified page to master data store 106a until all the update data necessary to redo or undo the modification is stored in the persistent transaction log records of at least the threshold number of data nodes in replication group 114.

Master data node 104a thus ensures that on-going changes have been sufficiently replicated to replica data nodes 104b, 104c, 104d, 104e, 104f, 104g before committing changes to persistent data store 106a. Master data node 104a, however, does not have to unduly delay or suspend commit processing because of delays or failures at a small number of replica nodes.

Figure 2:
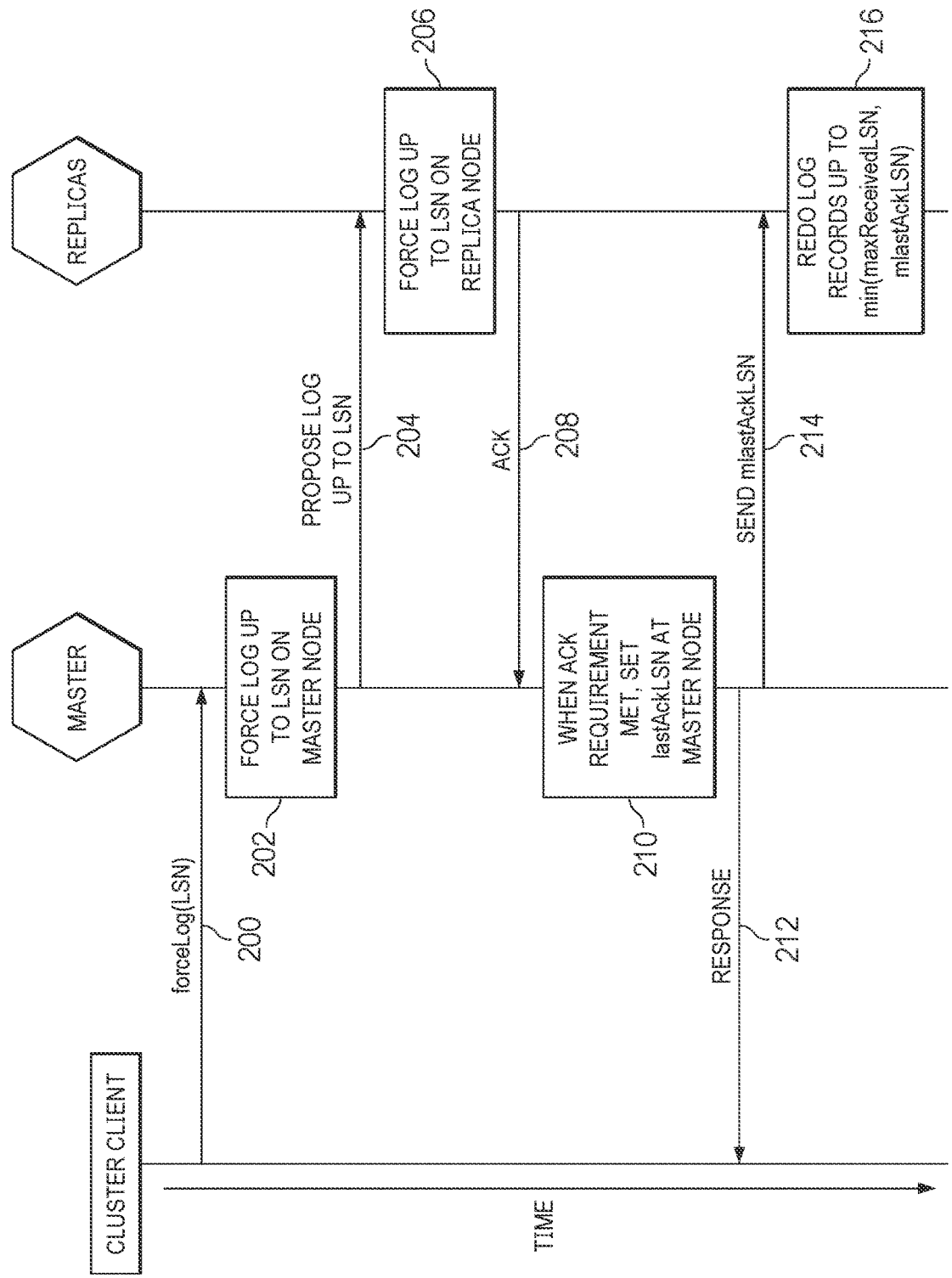
FIG. 2 illustrates one example embodiment of a replication flow to replicate updates from a master data node to replica data nodes.

FIG. 2 illustrates one example embodiment of a replication flow to replicate updates from a master data node to replica data nodes. FIG. 3A, FIG. 3B, FIG. 3C, FIG. 3D and FIG. 3E, illustrate one example of master node transaction log 107a and replica node transaction logs 107b, 107c, 107d, 107e, 107f, 107g at different points in a replication flow. FIG. 3F, FIG. 3G, FIG. 3H and FIG. 3I illustrate one example embodiment of a replica node recovery process.

Figure 3A:
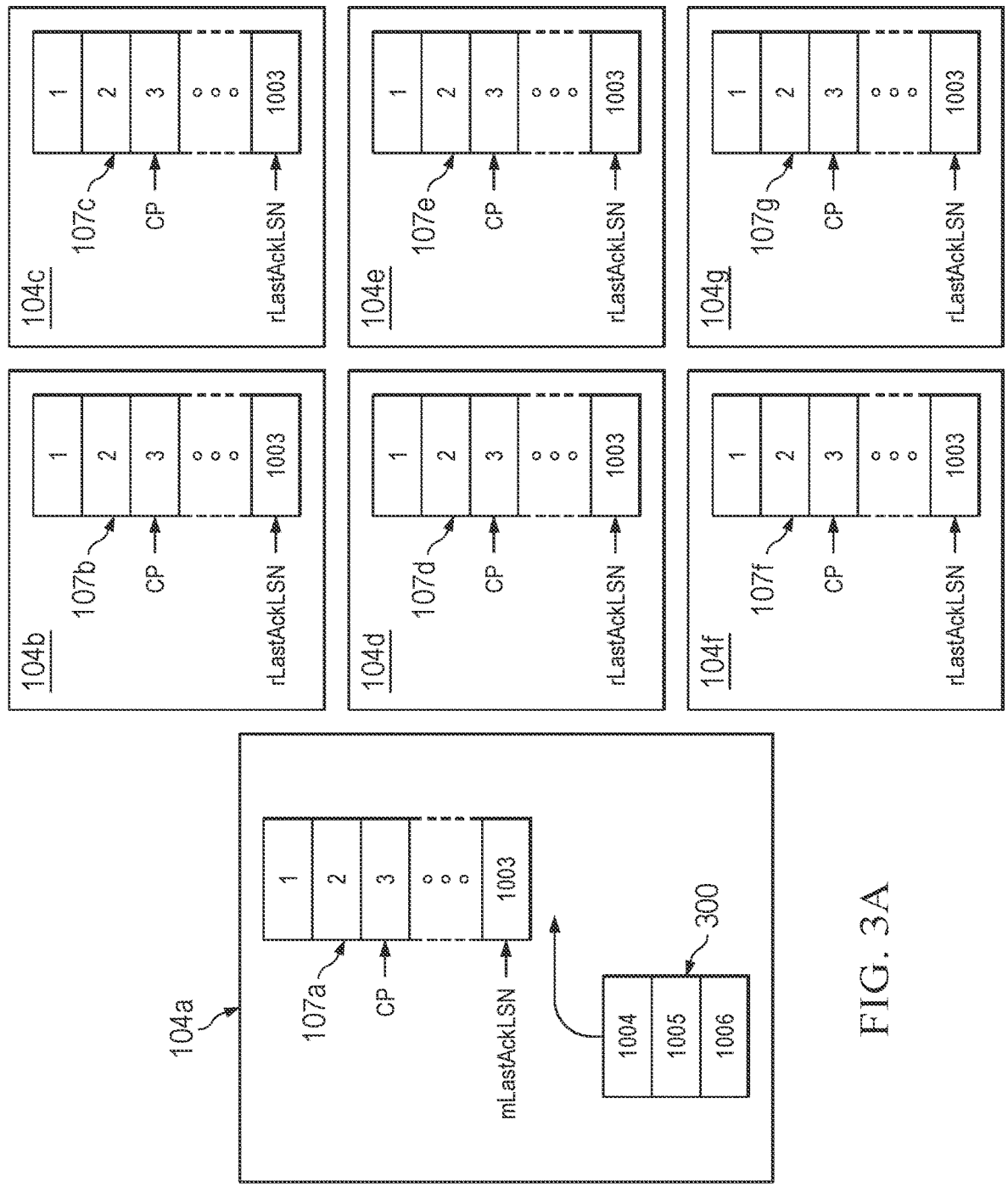
FIG. 3A illustrates one embodiment of a master node transaction log, transaction log buffer and replica node transaction logs at first point in time.

With reference to FIG. 2 and FIGS. 3A-3I, at an initial time illustrated in FIG. 3A, master data node 104a has a transaction log 107a containing transaction log records with LSNs 1-1003. Transaction log buffer 300 of master data node 104a contains transaction log records with LSNs 1004-1006 that have not yet been forced to master node transaction log 107a.

As would be appreciated by those in the art, transaction log 107a may include checkpoint records used in restart recovery (for the sake of example, a checkpoint (CP) is indicated). Master data node 104a further tracks a current master last acknowledged transaction log record (indicated in FIG. 3A as mLastAckLSN). The current master acknowledged transaction log record may be set in the transaction log file 107a or another location. The mLastAckLSN may be used to control the changes applied by replica data nodes during normal operation or recovery as discussed below.

Each replica data node 104b, 104c, 104d, 104e, 104f, 104g includes a replica node transaction log 107b, 107c, 107d, 107e, 107f, 107g, respectively, and tracks a replica data node last acknowledged transaction log record, indicated by rLastAckLSN, for use during replica node recovery. The current replica last acknowledged transaction log record may be set in the replica node transaction log file or other location at the replica node. In the example of FIG. 3A, the replica transaction logs 107b, 107c, 107d, 107e, 107f, 107g are up to date with the master transaction log 107a.

Figure 3B:
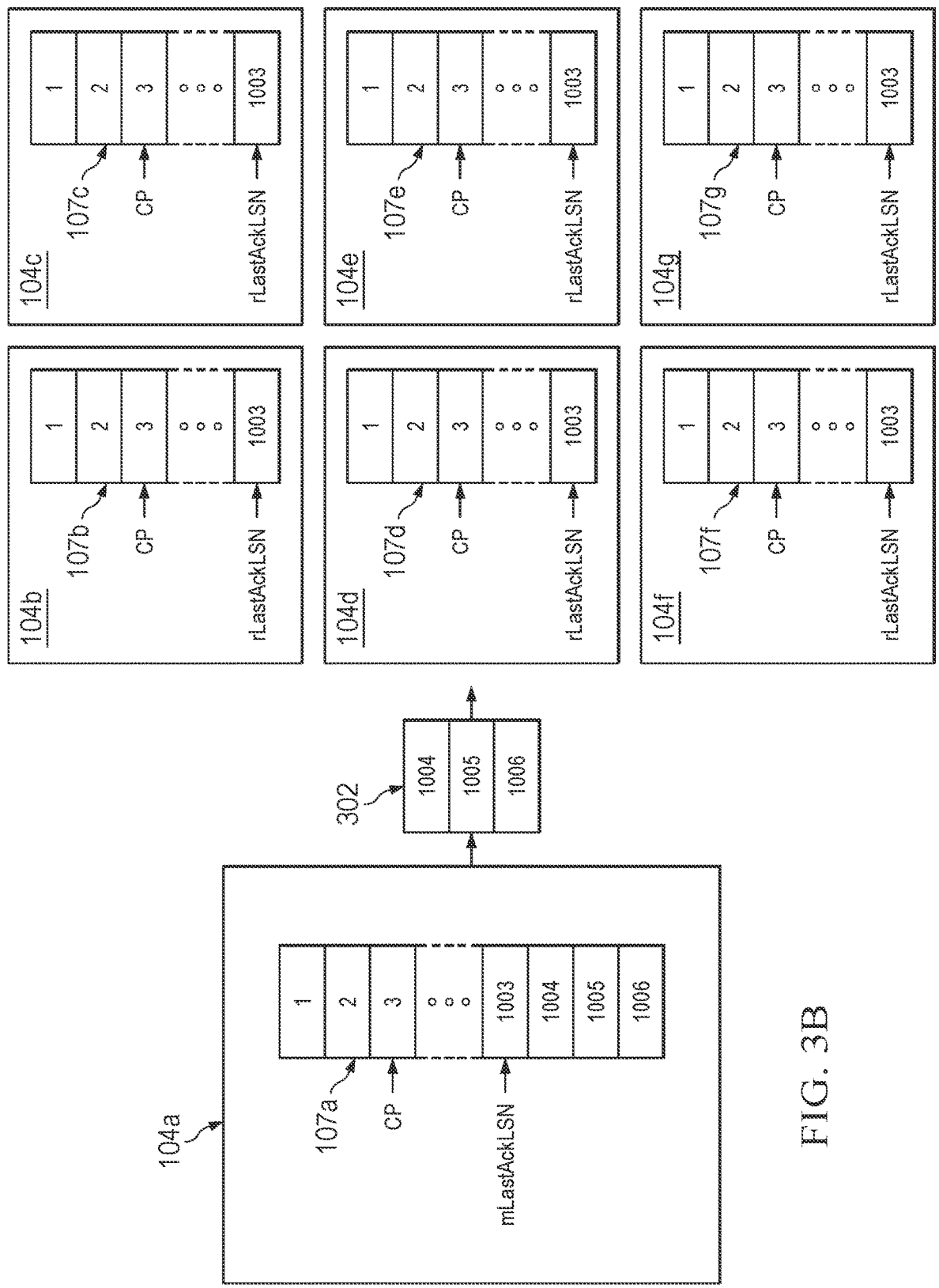
FIG. 3B illustrates one embodiment of a master data node sending a log proposal to replica data nodes.

As illustrated in FIG. 2, master node 104a processes an operation from a client (e.g., cluster client 120) that causes a forceLog(LSN) event to occur (step 200) to force the log up to a specified LSN. For example, when master data node 104a processes a commit in a transaction, a transaction manager may generate forceLog(LSN) with the LSN of the last transaction log record for that transaction (e.g., the LSN of the commit transaction log record for the transaction). Master data node 104a forces all transaction log records up to that LSN from transaction log buffer 300 to transaction log 107a (step 202). As illustrated in FIG. 3B, master node 104a appends transaction log records with LSNs 1004-1006 to the persistently stored master node transaction log 107a.

Based on successfully forcing the transaction log records from volatile memory to persistent storage, master data node 104a sends a log proposal 302 containing transaction log records subsequent to the mlastAckLSN to the replica nodes (step 204). In the example of FIG. 3B, master data node 104a sends log proposal 302 containing transaction log records with LSNs 1004-1006 to the replica data nodes.

Figure 3C:
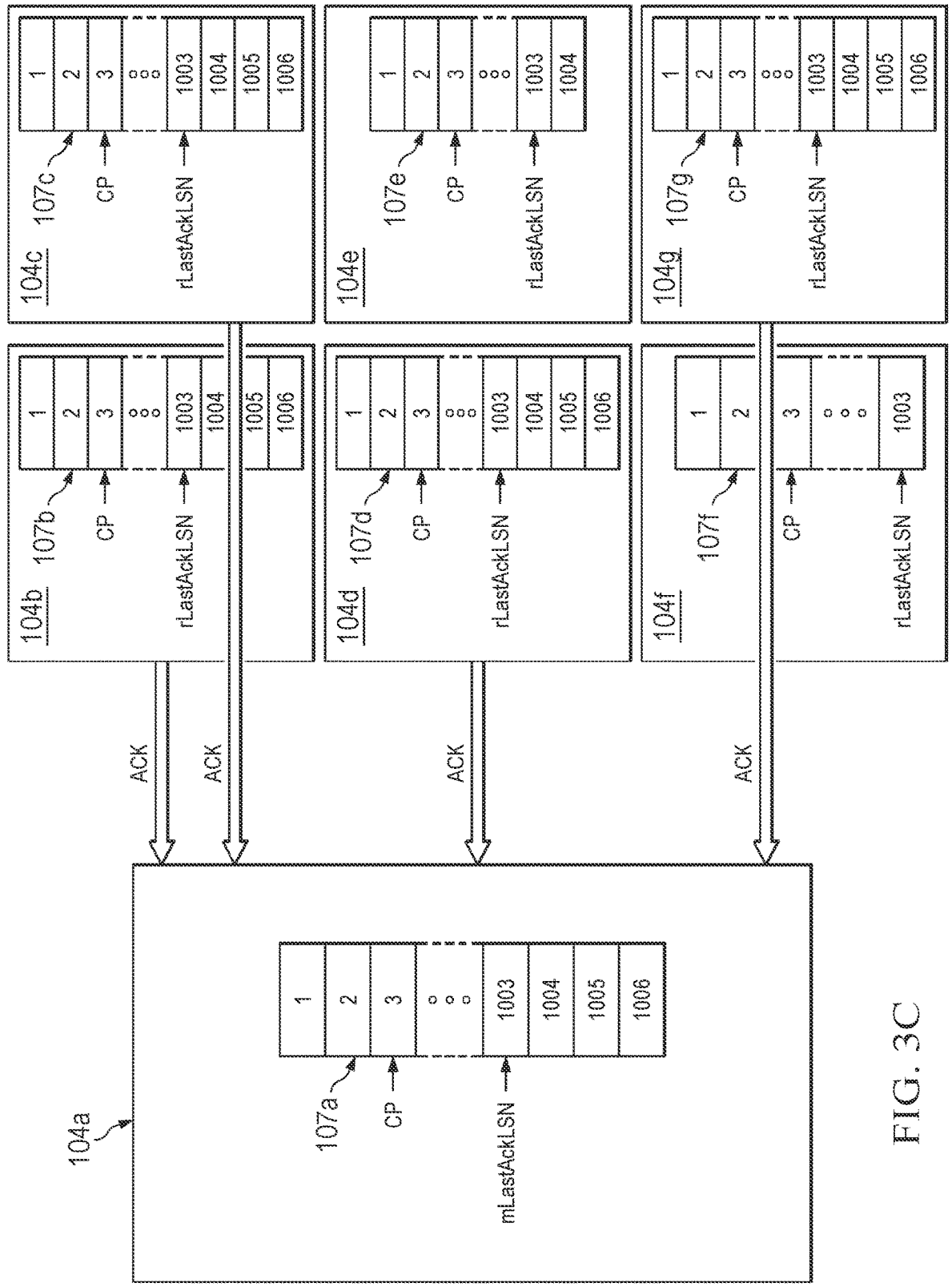
FIG. 3C illustrates one embodiment of replica data nodes acknowledging a log proposal.

Each replica data node 104b, 104c, 104d, 104e, 104f, 104g that receives the log proposal 302 writes the transaction log records from the log proposal 302 to that node's replica node transaction log 107b, 107c, 107d, 107e, 107f, 107g, respectively (step 206). When the transaction log records from log proposal 302 are successfully written to a replica data node's persistent transaction log, the replica data node 104b, 104c, 104d, 104e, 104f, 104g sends an acknowledgement to master data node 104a (step 208) to indicate that the replica node 104b, 104c, 104d, 104e, 104f, 104g has updated its replica node log 107b, 107c, 107d, 107e, 107f, 107g with the transaction log records from log proposal 302. With reference to FIG. 3C, transaction logs 107b, 107c, 107d, 107g illustrate that replica data nodes 104b, 104c, 104d, 104g successfully received and persistently stored the transaction log records from log proposal 302. In this example, data node 104e however experienced a failure and, as indicated by replica node transaction log 107e, only partially stored the transaction log records from log proposal 302. Data node 104f also experienced a failure and, as indicated by replica transaction log 107f, did not receive log proposal 302 at all.

Master data node 104a waits to receive acknowledgements of the log proposal 302 from replica data nodes 104b, 104c, 104d, 104e, 104f and 104g and determines if the acknowledgements of the log proposal meet an acknowledgement requirement that specifies an acknowledgement threshold. For example, if the acknowledgement requirement is quorum-1, then in FIG. 3C, the acknowledgement threshold is three.

If an insufficient number of acknowledgements of the log proposal 302 are received to meet the acknowledgement requirement (e.g., before a timeout or other condition is met), master node 104a may take a specified action. In one embodiment, if the event that forced the transaction log records from the transaction log buffer to the transaction log was based on a transaction from cluster client 120, master data node 104a may return an error to cluster client 120 indicating that a transaction was not committed. If the event was an internally generated event, such as the buffer manager indicating that the transaction log buffer was full, master data node 104a may retry the proposed log at a later time.

Figure 3D:
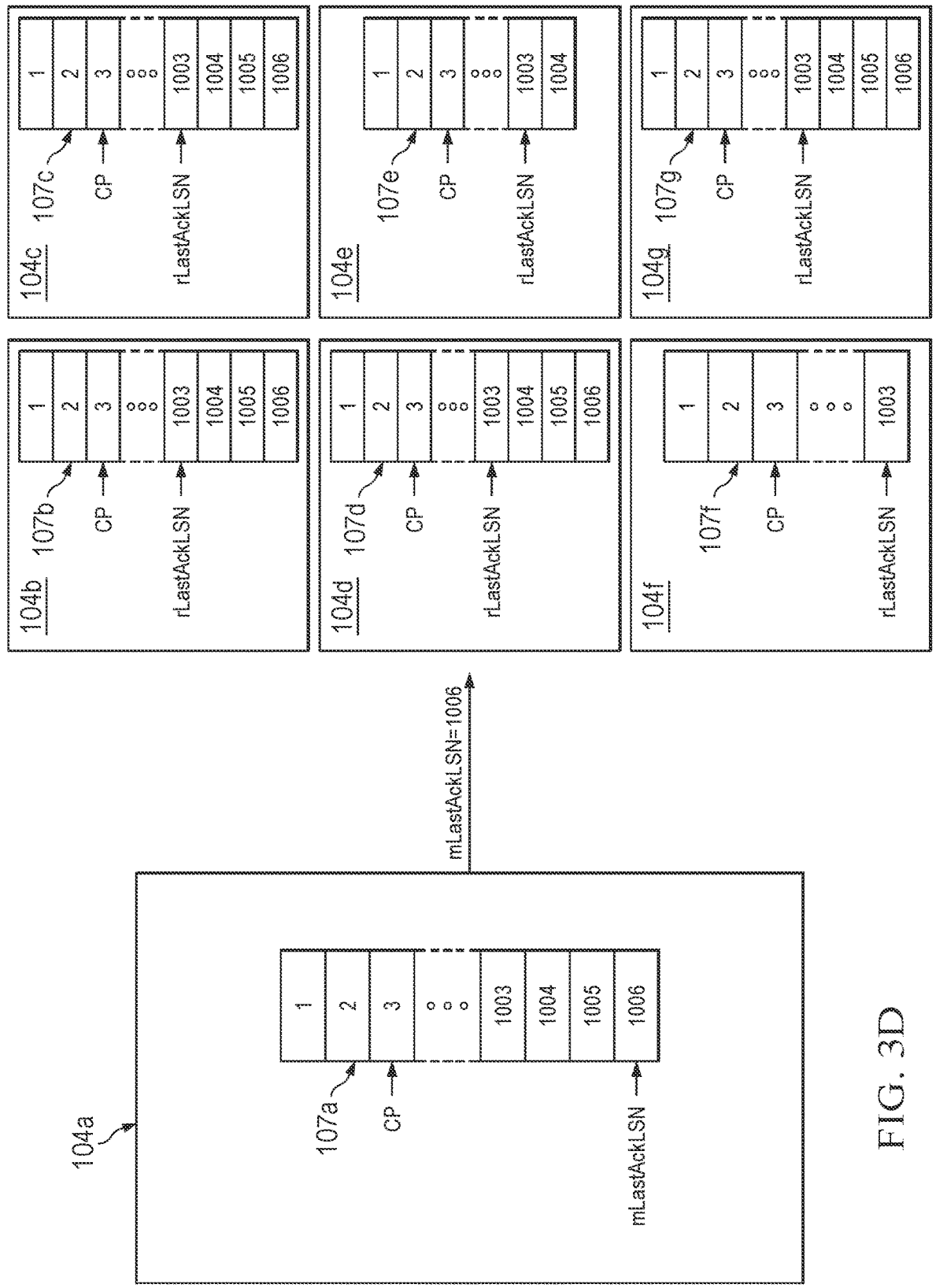
FIG. 3D illustrates one embodiment of a master data node sending an indication of a master node last acknowledged log record to replica data nodes.

On the other hand, based on a determination that the received acknowledgements of the log proposal meet the acknowledgement requirement, master data node 104a sets the transaction log record with the highest LSN from the acknowledged log proposal 302 as the master node last acknowledged transaction log record in master node transaction log 107a (step 210). Using the example of FIG. 3C with an acknowledgement threshold of three (e.g., quorum-1), master data node 104a receives three acknowledgements and thus determines that the acknowledgements meet the acknowledgement requirement. Consequently, as illustrated in FIG. 3D, master data node 104a sets LSN 1006 as the mLastAckLSN.

If the event that forced the log up to LSN 1006 in FIG. 3A was a transaction commit, master data node 104a may complete commit processing of the transaction based on the determination that the received acknowledgements of the log proposal 302 meet the acknowledgement requirement. For example, master data node 104a may write all the changes of the transaction (or the remaining changes of the transaction) to master data store 106a. Master data node 104a may also indicate to the client that the transaction has been successfully committed to the master data store 106a (step 212) or take other actions.

Master data node 104a further sends an identification of the new master node last acknowledged transaction log record to the plurality of replica data nodes 104b, 104c, 104d, 104e, 104f, 104g in the replication group 114 (step 214). FIG. 3D, for example, depicts master data node 104a sending a signal to the replica data nodes that includes mlastAckLSN=1006 (step 214).

Responsive to receiving an mLastAckLSN, a replica data node that did not experience a failure writes updates up to the last received mLastAckLSN (e.g., the mLastAckLSN received at step 214) to the replica data node's replica data store. The mLastAckLSN can thus be used to limit the changes that a replica data node applies during normal operation. The replica data node can also update the replica node last acknowledged transaction log record for that replica data node to the master last acknowledged transaction log record. According to one embodiment, this is done after the replica data node writes updates from the transaction log records up to the mLastAckLSN to the respective replica data store.

Figure 3E:
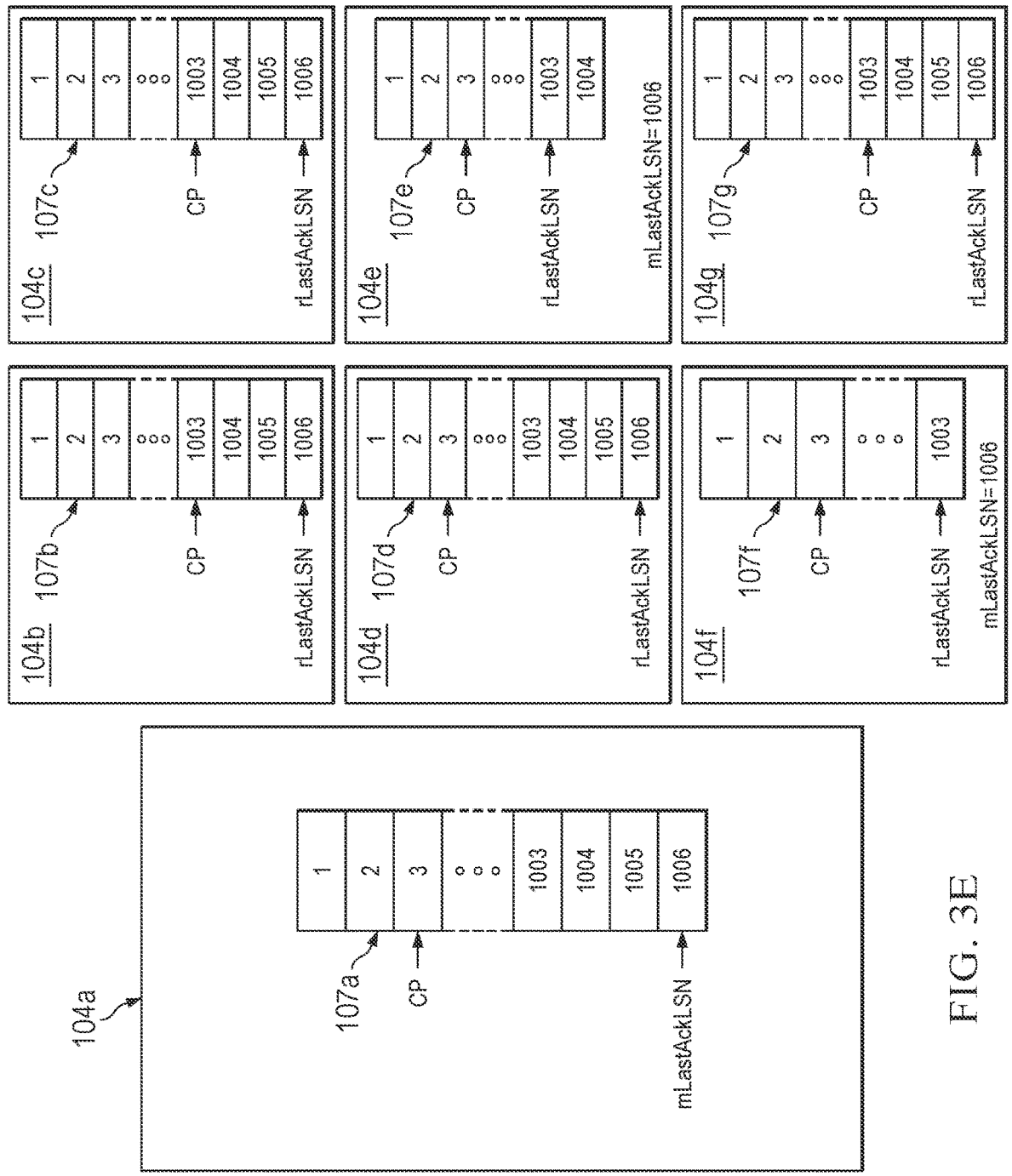
FIG. 3E illustrates one embodiment of replica data nodes updating a replica node last acknowledged transaction log record.

In the depicted example, each available replica data node 104b, 104c, 104d, 104e, 104f, 104g commits the changes in that data node's transaction log up to min(lastLSN, mLastAckLSN), where lastLSN is the LSN of the last transaction log record in the replica data node's replica node transaction log and mLastAckLSN is the last received mlastAckLSN (e.g., the mlastAckLSN received in step 214) (step 216). In the example of FIG. 3E, replica data nodes 104b, 104c, 104d, 104g can commit the updates in transaction log records up to LSN1006 on replica data stores 106b, 106c, 106d, 106g respectively. Data node 104e, on other hand, only commits the updates up to transaction log record 1004 to replica data store 106e.

As illustrated in FIG. 3E, each replica data node 104b, 104c, 104d, 104g has transaction log records in its transaction log 107b, 107c, 107d, 107g up to the LSN equal to mlastAckLSN received at step 214. These data nodes commit the updates up the mLastAckLSN to the respective data store 106b, 106c, 106d, 106g and update the rlastAckLSN to the received mlastAckLSN. Thus, replica data nodes 104b, 104c, 104d 104g set the rlastAckLSNs of transaction logs 107b, 107c, 107d, 107g respectively, to the transaction log record having LSN 1006. However, because the transaction log record with LSN 1006 is not present in transaction logs 107e and 107f, data nodes 104e and 104f do not set a new replica node last acknowledged transaction log record.

As discussed above, mLastAckLSN can be used to control the updates a replica data node applies to a replica data store during normal operation, mLastAckLSN and rLastAckLSN may be used to facilitate recovery of a replica data node 104b, 104c, 104d, 104e, 104f, 104g. During a recovery process of a replica data node 104b, 104c, 104d, 104e, 104f, 104g, the replica data node performs redo changes in the transaction log records from the last successful checkpoint up the rLastAckLSN. The replica data node may further request transaction log records from master data node 104a that are subsequent to the rLastAckLSN and perform redos up to the mLastAckLSN. The mLastAckLSN may thus be used to control the last redo log record for replica recovery as discussed below.

Figure 3F:
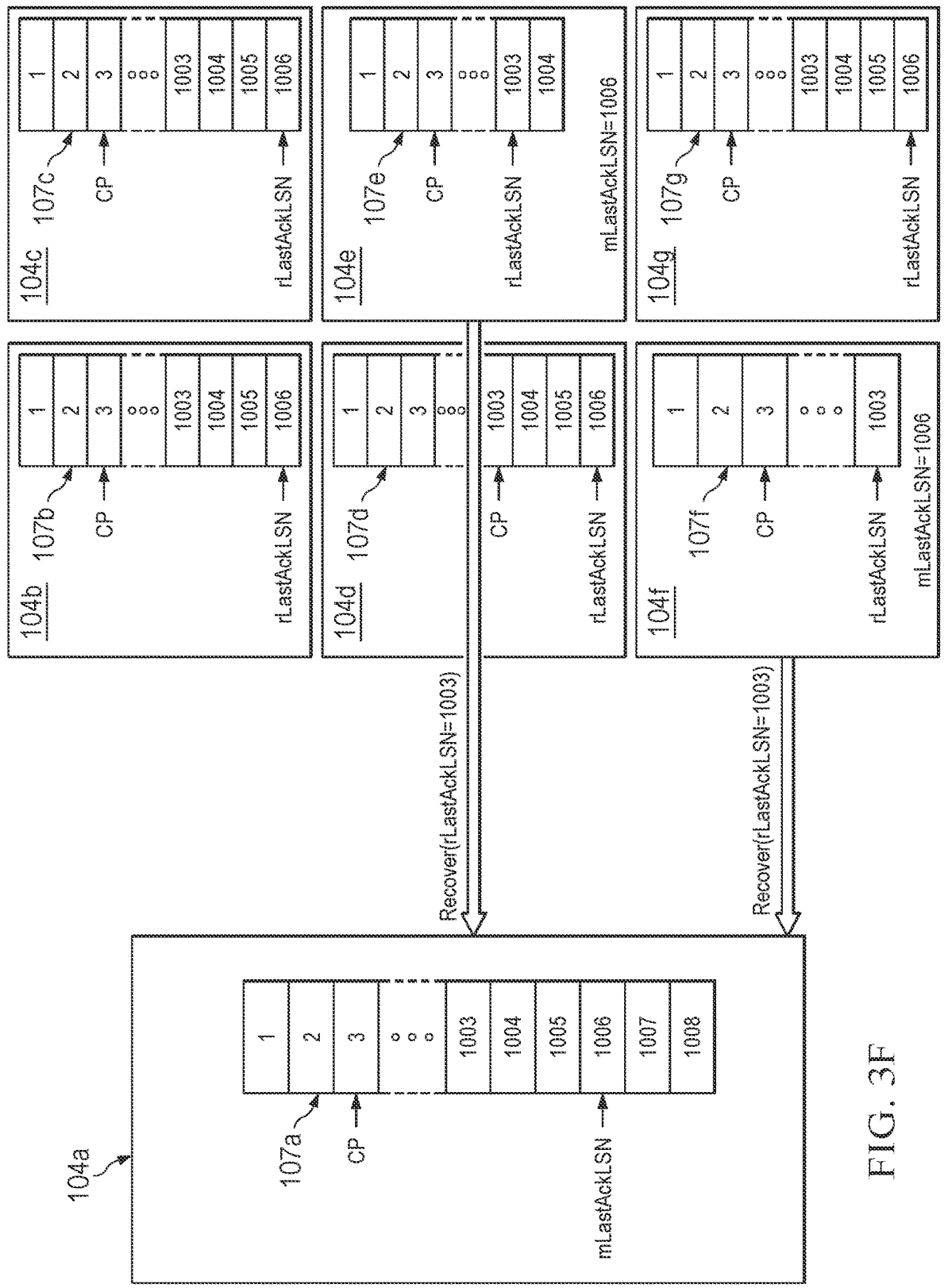
FIG. 3F illustrates one embodiment of replica data nodes sending recovery requests to a master data node.
Figure 3G:
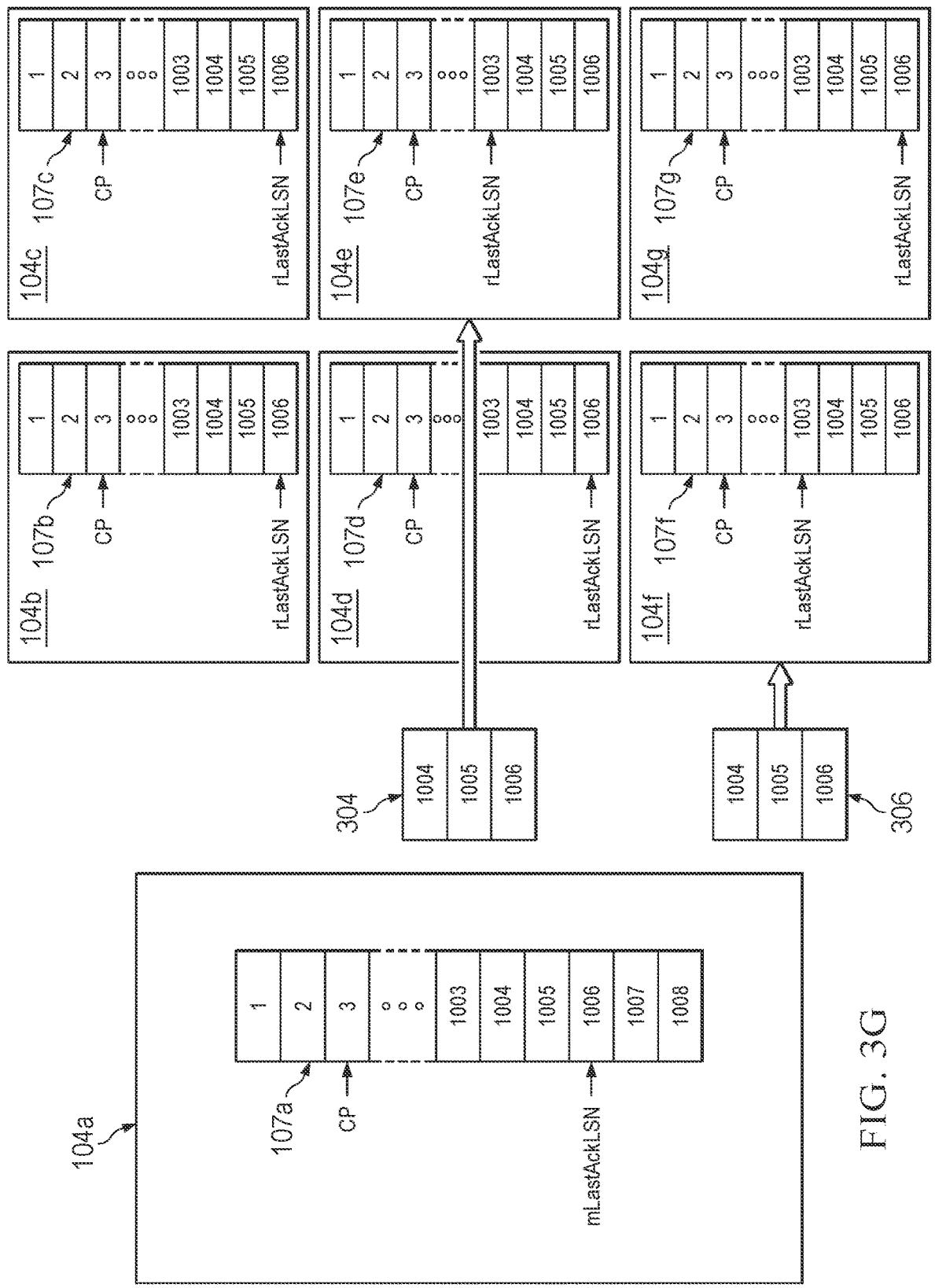
FIG. 3G illustrates one embodiment of a master data node sending recovery proposal logs to replica data nodes.

FIG. 3F illustrates an example of replica data nodes requesting recover log proposals from the master data node. FIG. 3F further depicts that additional transaction log records have been added to master node transaction log 107a. In the illustrated example, replica data node 104e and replica data node 104f send recovery requests to master data node 104a requesting transaction log records subsequent to LSN 1003. Responsive to a recovery request from a replica data node, master data node 104a sends recovery log proposals including the set of transaction log records (rLastAckLSN, mLastAckLSN). Thus, as illustrated in the example of FIG. 3G, master data node 104a sends recovery log proposals 304, 306 that contain the transaction log records with LSNs 1004-1006. While in this example, master data node 104a sends the same transaction log records in the recovery log proposals 304, 306 to replica data nodes 104e and 104f, the particular recovery log proposal sent to a replica node is dependent on the rlastAckLSN indicated in the recovery request from the replica data node.

Figure 3H:
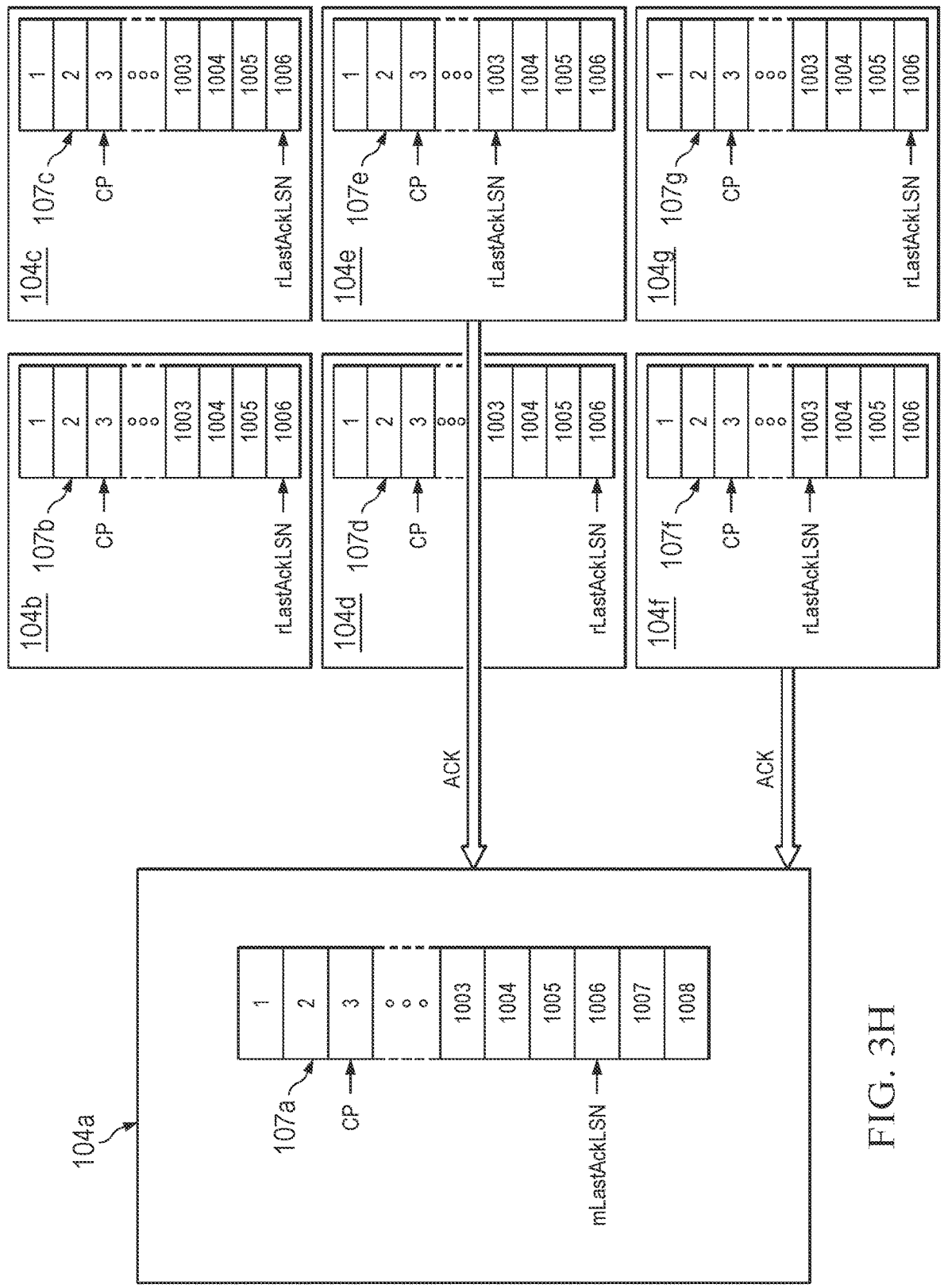
FIG. 3H illustrates one embodiment of replica data nodes acknowledging recovery proposal logs.
Figure 3I:
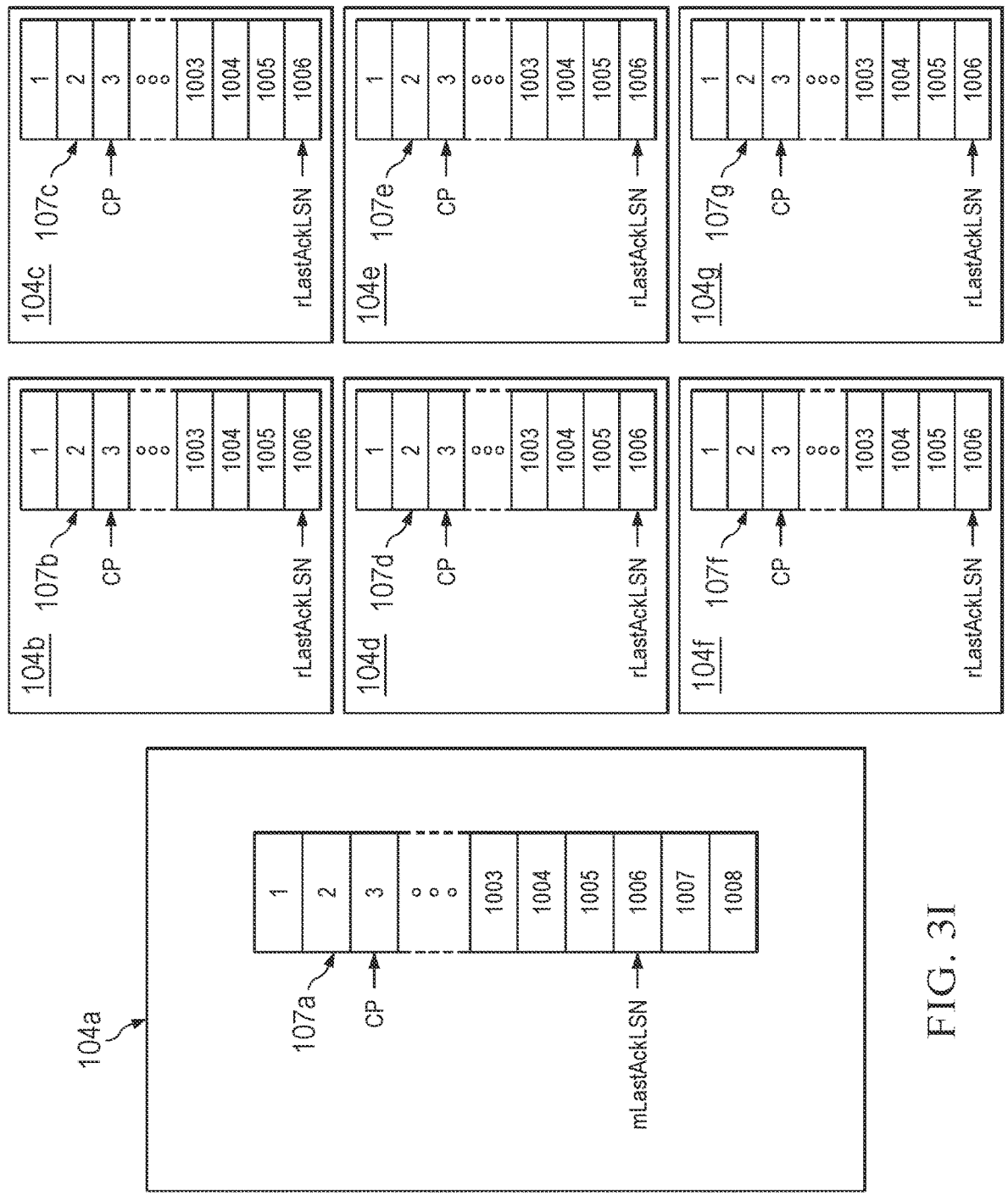
FIG. 3I illustrates an updated state of a master node transaction log and replica node transaction logs.

Replica data node 104e and replica data node 104f may add any new transaction log records from a received recovery log proposal 304, 306 to the respective transaction log 107e, 107f as illustrated in FIG. 3G. Turning to FIG. 3H, each replica data node that receives a recovery log proposal and successfully persistently stores the transaction log records from the received recovery log proposal sends a recovery acknowledgement indicating that the transaction log records in the recovery log have been stored at that data node (e.g., in the data node's transaction log). The rLastAckLSN for data nodes 104e and 104f may be updated when, for example, data nodes 104e and 104f commit the changes in transaction logs 107e and 107f, respectively, to replica data stores 106e and 106f respectively or at the occurrence of another event. As shown in FIG. 3I, the transaction logs 107e, 107f of the nodes 104e, 104f that experienced failures can thus be recovered up to mLastAckLSN of the master node transaction log 107a.

Master data node 104a may queue additional log proposals to the replica data nodes in the replica group until it has received recovery acknowledgements for each outstanding recovery log proposal. For example, FIGS. 3F-3I illustrate that additional log records have been forced to master node transaction log 107a. However, master data node 104a can wait to send a log proposal containing these transaction log records until replica data nodes 104e, 104f have recovered up to LSN 1006. This can help ensure that the recovered replica data nodes have transaction logs that are up to date with the master node transaction log 107a, at least up to mLastAckLSN, before further changes are replicated. According to one embodiment, a master data node 104a delays sending additional log proposals to ensure that all replica data nodes are up to date only when the data node has recently been elected as the master data node (master data node election is discussed below). In other circumstances, master data node 104a can continue to send new log proposals to the replica data nodes in a replication group, even if some replica data nodes in the replication group are in a recovery process.

During a recovery process of master data node 104a, master data node 104a may implement a redo phase and an undo phase. In the redo phase, the master data node 104a performs redo changes in the transaction log records from the last successful checkpoint in transaction log 107a to the last LSN in transaction log 107a. Thus, for example, if master data node 104a entered recovery using transaction log 107a illustrated in FIG. 3F, master data node 104a may perform redo changes in the transaction log records 4-1008 on master data store 106a. According to one embodiment, when master data node 104a processes a commit log entry from transaction log 107a during the redo phase, master data node 104a generates a log proposal to the replica data nodes.

Some of the transaction log records in transaction log 107a may be records corresponding to transactions that had not finished before a failure of master data node 104a (e.g., transactions for which commit had not yet been logged). Master data node 104a can track any transaction log records that are associated with unfinished transactions. In the undo phase, any unfinished transactions can be rolled back by undoing their log records in reverse order. According to one embodiment, master data node 104a can undo any transaction for which a commit was not logged in transaction log 107a.

Figure 4A:
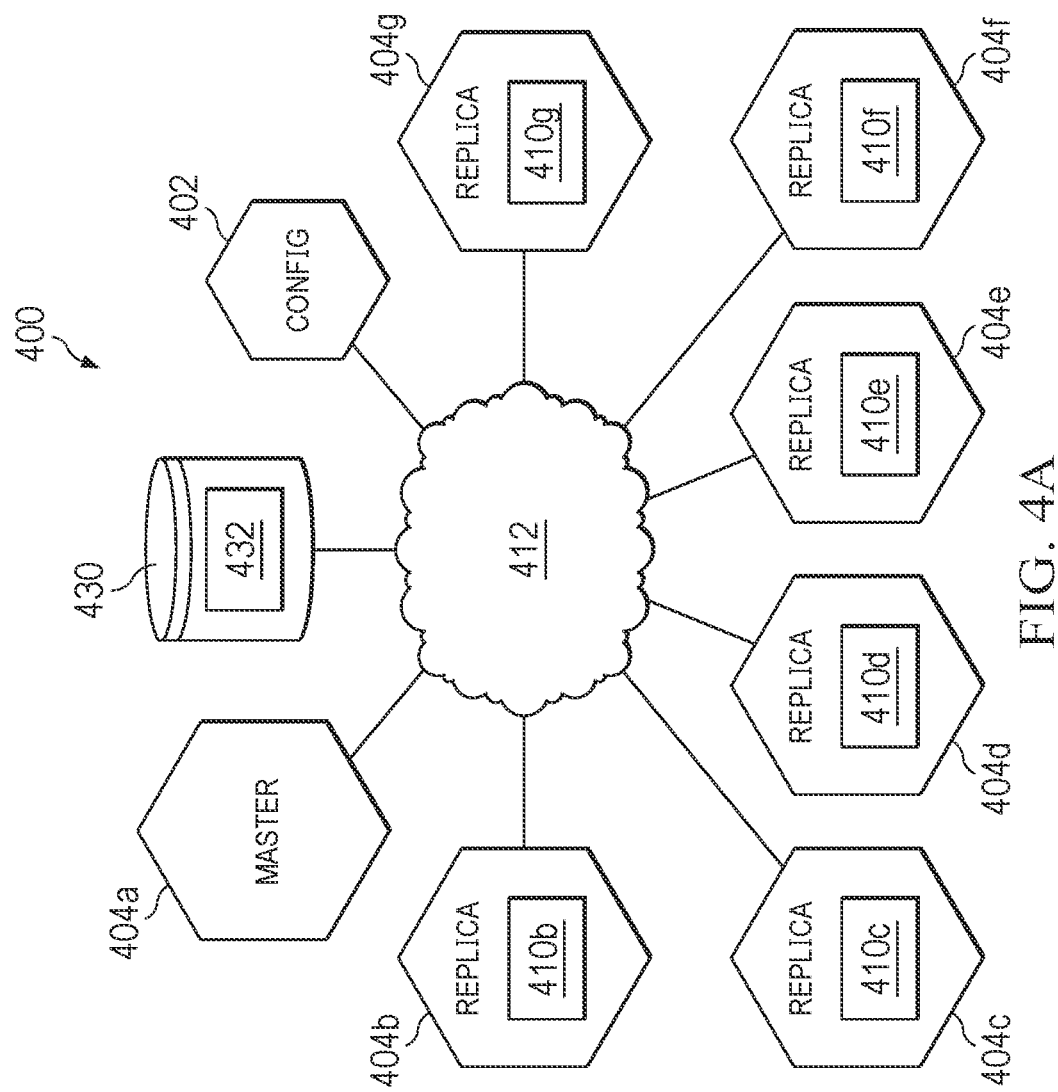
FIG. 4A illustrates one embodiment of a set of data nodes.
Figure 4B:
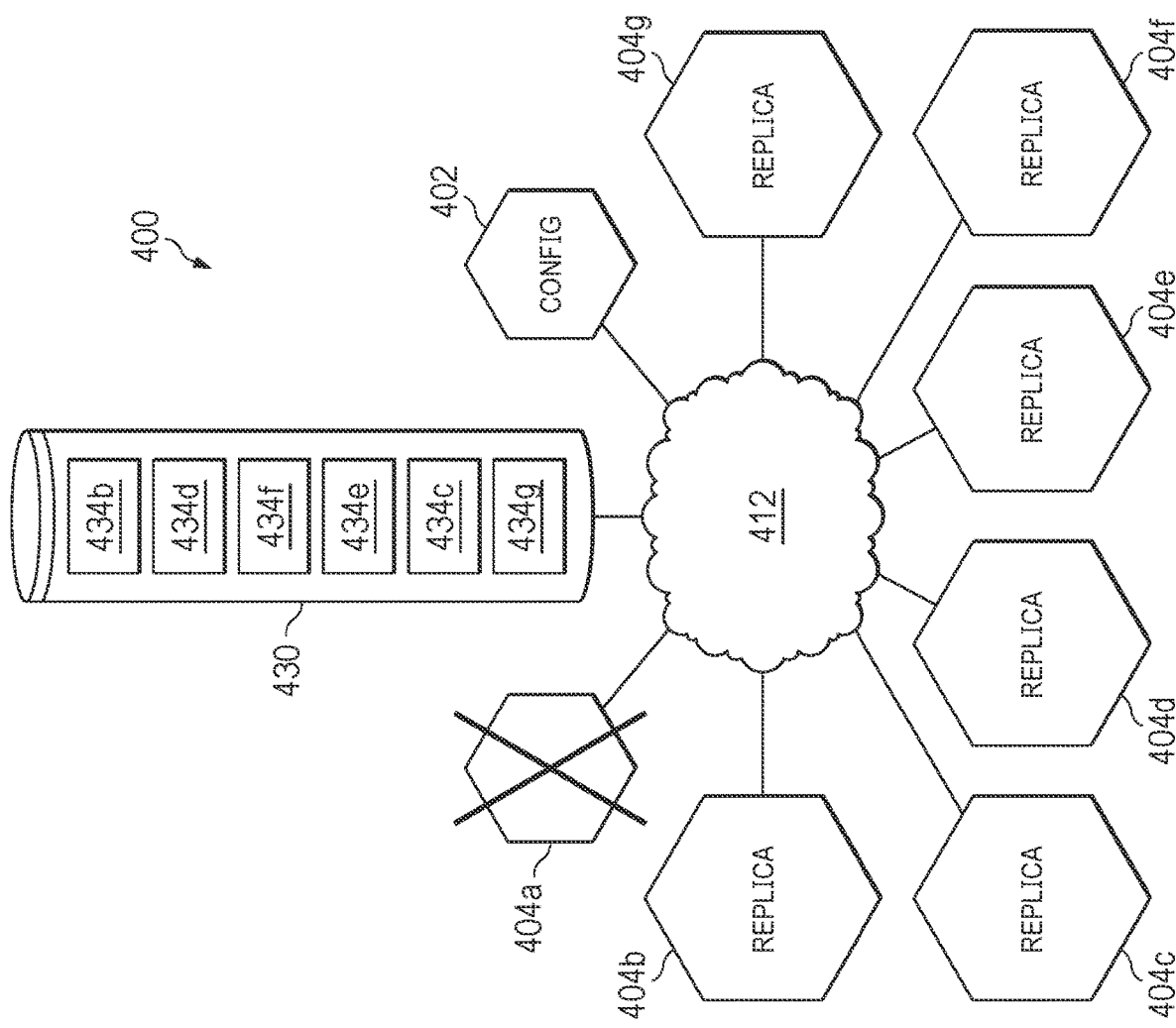
FIG. 4B illustrates one embodiment of a set of replica data nodes performing master node election.

According to one embodiment, failure of the master data node results in the election of a new master data node and automatic failover to the new master data node. FIG. 4A and FIG. 4B are block diagrams illustrating one embodiment of automatic failover to a new master data node. FIG. 4A depicts a replication group 400 having a configuration node 402, a master data node 404a, replica data nodes 404b, 404c, 404d, 404e, 404f, 404g, and a shared storage location 430 coupled by a network 412. Replication group 400 may be an example of replication group 114 and data nodes 404a, 404b, 404c, 404d, 404e, 404f, 404g may be examples of data nodes 104a, 104b, 104c, 104d, 104e, 104f, 104g.

The master data node 404a establishes a master data node ephemeral data structure 432 in a shared namespace 430, such as a shared distributed filesystem or other shared namespace, and broadcasts the location of ephemeral data structure 432 to replica data nodes 404b, 404c, 404d, 404e, 404f, 404g. Data structure 432 is ephemeral in that it lasts only as long as the session that created the ephemeral data structure 432 remains active. Each replica data node 404b, 404c, 404d, 404e, 404f, 404g maintains a watcher on the ephemeral data structure 432. Thus, as illustrated, replica data node 404b comprises watcher 410b, replica data node 404c comprises watcher 410c, replica data node 404d comprises watcher 410d, replica data node 404e comprises watcher 410e, replica data node 404f comprises watcher 410f, replica data node 404g comprises watcher 410g.

If master data node 404a fails, ephemeral data structure 432 is removed. The removal of ephemeral data structure 432 is detected by watchers 410b, 410c, 410d, 410e, 410f, 410g and thus, replica data nodes 404b, 404c, 404d, 404e, 404f, 404g are notified that master data node 404a has failed.

Based on a determination that master data node 404a has failed, each replica data node 404b, 404c, 404d, 404e, 404e, 404f, 404g creates a replica node ephemeral data structure at a predefined location in the shared namespace 430. Each replica node ephemeral data structure is ephemeral in that it lasts only as long as the session that created it remains active. The replica node ephemeral data structures are written in sequence order. In other words, the first replica node ephemeral data structure written to the shared storage location during a failover is considered first in the sequence and so on.

Turning to FIG. 4B, in the example illustrated, replica data node 404b creates replica node ephemeral data structure 434b first, replica data node 404d creates replica node ephemeral data structure 434d second, replica data node 404f creates replica node ephemeral data structure 434f third, replica data node 404e creates replica node ephemeral data structure 434e fourth, replica data node 404c creates replica node ephemeral data structure 434c fifth, replica data node 404g creates replica node ephemeral data structure 434g sixth. The replica data nodes 404b, 404c, 404d, 404e and 404f further exchange the highest LSN in each replica data node's persistently stored replica node transaction log. The replica data nodes are configured to select the data node with the highest LSN as the new master data node. If the highest LSN is shared by two or more of the replica data nodes, the replica data nodes are configured to select the replica data node that created the replica ephemeral data structure 434b, 434c, 434d, 434e, 434f, 434g with the lowest sequence number as the new master data node. For example, in FIG. 4B, if replica data node 404b and replica data node 404d share the same highest LSN, replica data node 404b becomes the new master because ephemeral data structure 434b is lower in sequence number than ephemeral data structure 434d. The identity of the new master data node 404b and location of the ephemeral data structure 434b is communicated to configuration node 402.

Figure 4C:
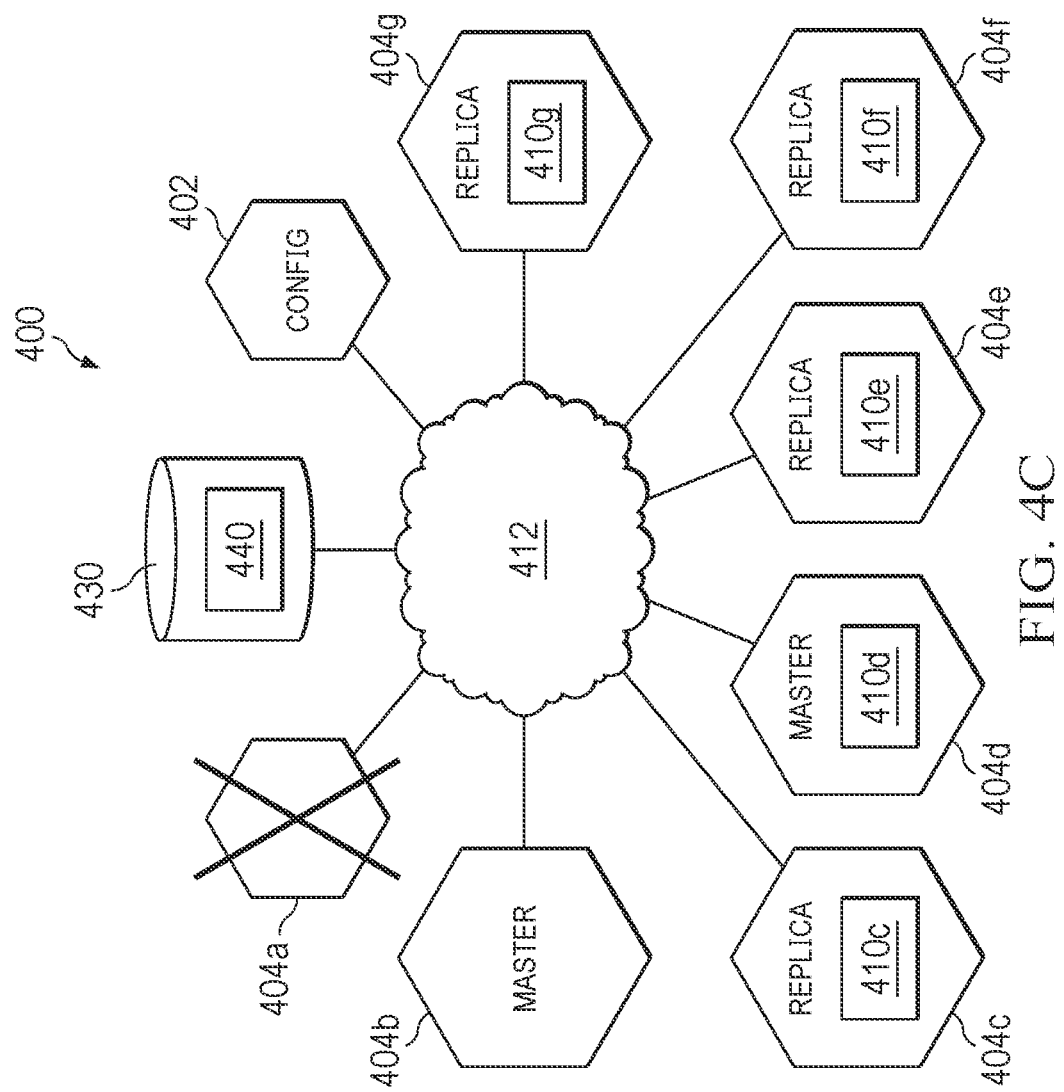
FIG. 4C illustrates a set of data nodes with a new master data node.

Thus, as illustrated in FIG. 4C, data node 404b becomes the master data node and creates a new master ephemeral data structure 440. The data nodes delete ephemeral data structures 434b, 434c, 434d, 434e, 434f, 434g. The remaining replica data nodes 404c, 404d, 404e, 404f, 404g set their respective watchers to watch ephemeral data structure 440.

The rLastAckLSN in data node 404b's stored transaction log becomes the new mLastAckLSN. New master data node 404b performs redo of transaction log records from the last checkpoint to mLastAckLSN in master data node 404b's persistently stored transaction log. During redo, master data node 404b sends a log proposal to replica data node 404c, 404d, 404e, 404f, 404g for commit log records. Master data node 404b undoes changes for unfinished transactions (e.g., transactions for which the persistent transaction log of data node 404b does not have a commit log record).

When master data node 404b receives acknowledgements from all of the replica data nodes 404c, 404d, 404e, 404f, 404g of the log proposals sent as part of the auto failover process, master data node 404b updates mLastAckLSN in its persistently stored transaction log (e.g., mLastAckLSN=LastLSN) and sends the identity of the new mLastAckLSN to each of the replica data nodes 404c, 404d, 404e, 404f, 404g. Further, master data node 404b signals the configuration node 402 and configuration node 402 indicates that master data node 404b is open for writes by cluster clients.

Figure 4D:
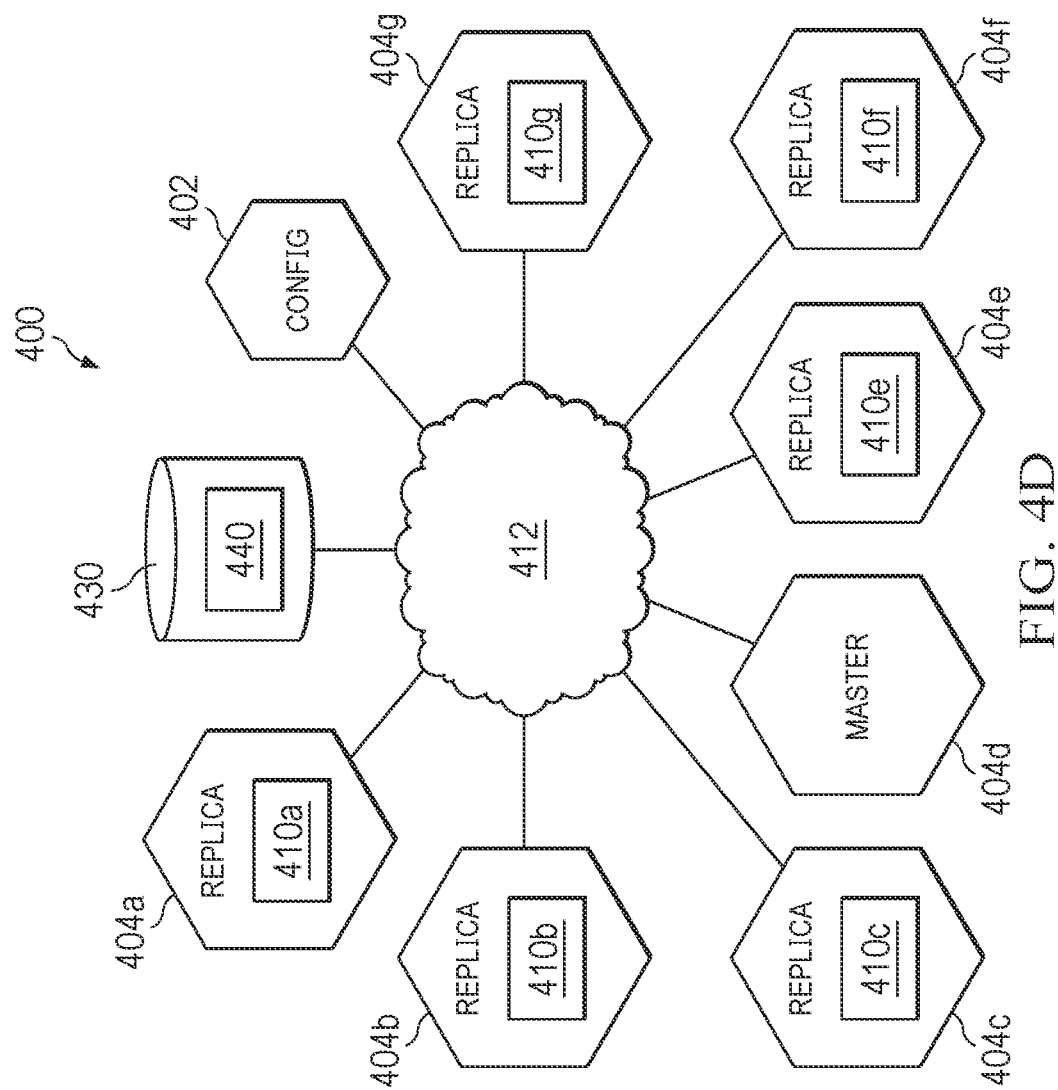
FIG. 4D illustrates a set of data nodes with the former master data node recovered as a replica data node.

If data node 404a becomes operational again (illustrated in FIG. 4D), data node 404a will now be a replica data node and, as such, will set a watcher 410a on ephemeral data structure 440. The mLastAckLSN maintained by data node 404a when data node 404a failed becomes the rLastAckLSN for replica data node 404a. Replica data node 404a can initiate replica recovery to recover as described above with respect to FIGS. 3F-3I.

According to one embodiment, the ephemeral data structures used in auto failover are ZooKeeper znodes (ZooKeeper is a distribute coordination service for distributed applications by THE APACHE SOFTWARE FOUNDATION of Forest Hill, Maryland). More particularly, ephemeral data structure 432, 440 may be ephemeral znodes created as children of a first persistent znode and ephemeral data structures 434b, 434c, 434d, 434e, 434f, 434g may be ephemeral, sequential znodes created as children of a second persistent znode. The configuration node 402 may include a ZooKeeper server and each replica data node may include a ZooKeeper client. Each data node 404a, 404b, 404c, 404d, 404e, 404f, 404g. When master data node 404a fails, the replica data nodes 404b, 404c, 404d, 404e, 404f, 404g elect a new master data node.

In prior examples, the acknowledgement requirement is based on the number of nodes in the replication group. In other embodiments, the acknowledgement requirement may be more complex. For example, the acknowledgement requirement may account for the fact that a replication group is distributed across data centers.

Figure 5:
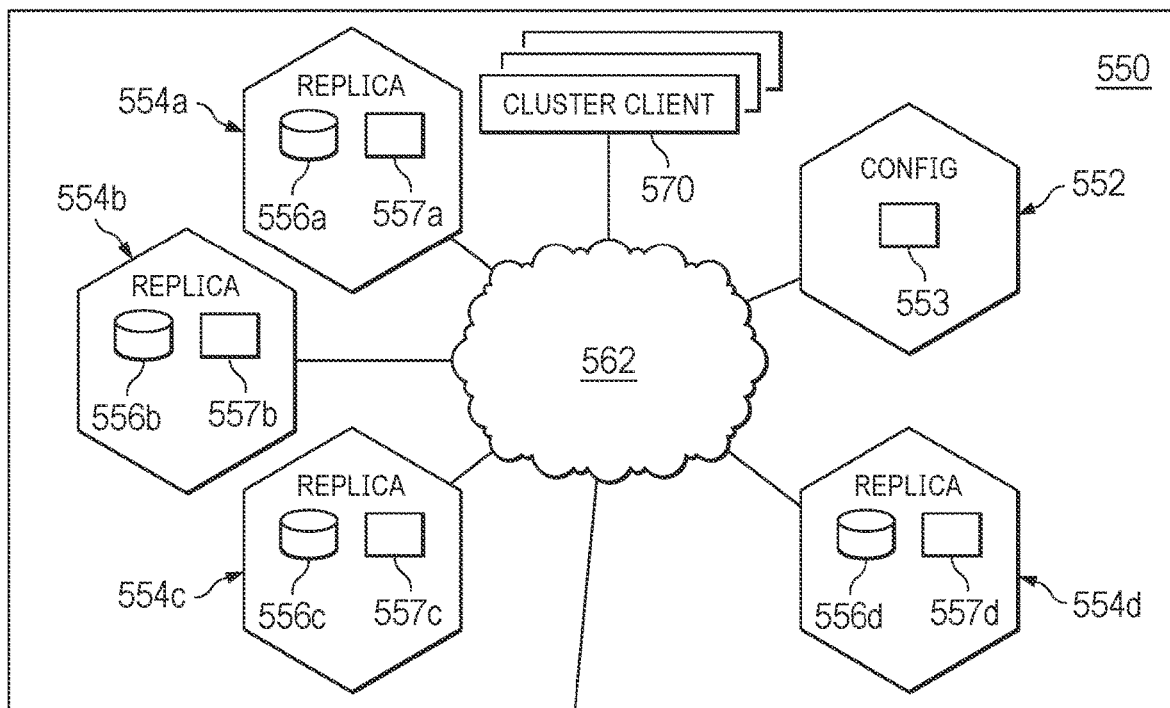
FIG. 5 illustrates one embodiment of a replication group that includes data nodes in multiple data centers.
Figure 5:
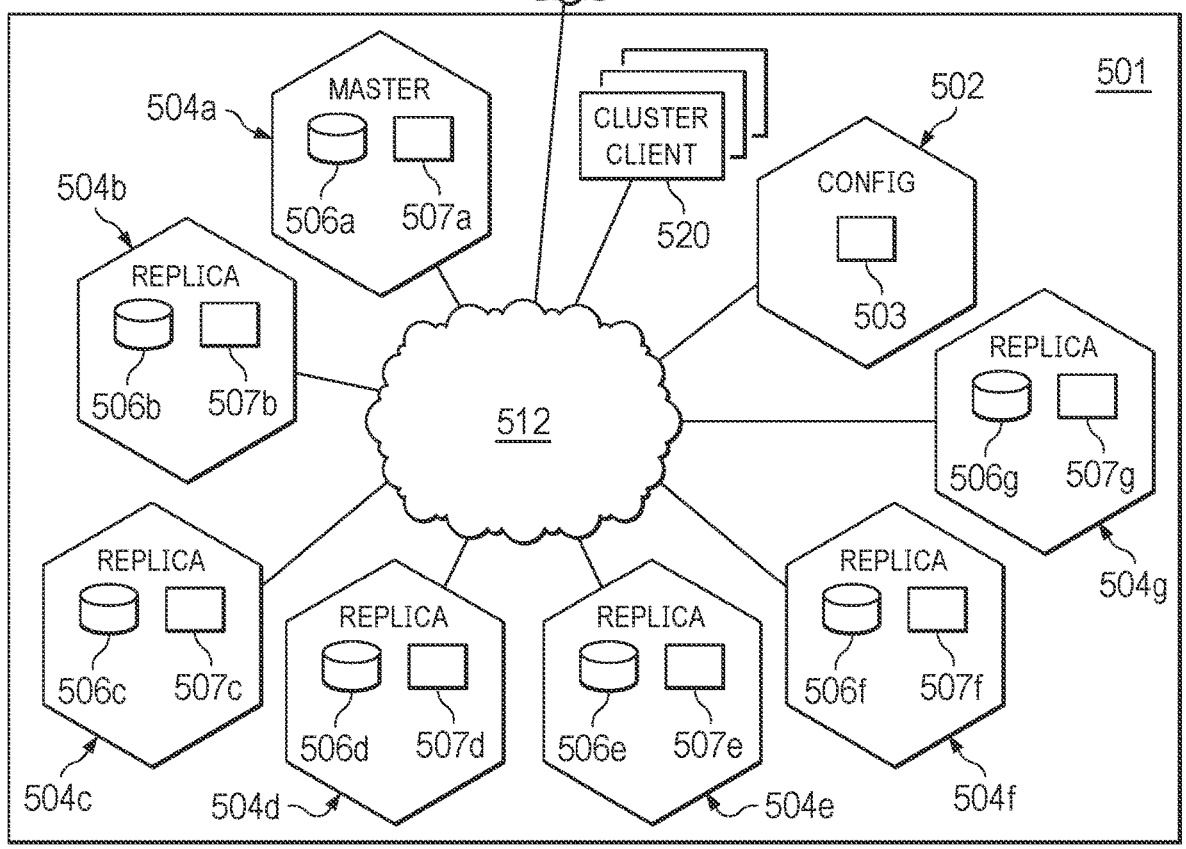

FIG. 5 is a diagrammatic representation of one embodiment of a cluster architecture 500 that includes a first data center 501 and a second data center 550. First data center 501 comprises a first cluster including configuration node 502, data node 504a, data node 504b, data node 504c, data node 504d, data node 504e, data node 504f, data node 504 and cluster clients 520 bi-directionally coupled by network 512. Second data center 550 comprises a second cluster comprising configuration node 552, data node 554a, data node 554b, data node 554c, data node 554d and cluster clients 570 bi-directionally coupled by network 562. First data center 501 and second data center 550 are bi-directionally coupled by network 572. According to one embodiment, network 512 and network 562 are each a LAN and network 572 is a WAN, such as the Internet. Thus, first data center 501 and second data center 550 can be geographically separated from each other over a large distance.

According to one embodiment, each data node of architecture 500 acts as a separate server that listens for and can accept incoming requests from other components of the cluster architecture. Each data node maintains a data store, such as a database or file system and a transaction log. For example, in the illustrated embodiment, node 504a maintains data store 506a and transaction log 507a, data node 504b maintains data store 506b and transaction log 507b, data node 504c maintains data store 506c and transaction log 507c, data node 504d maintains data store 506d and transaction log 507d, data node 504e maintains data store 506e and transaction log 507e, data node 504f maintains data store 506f and transaction log 507f, data node 504g maintains data store 506g and transaction log 507g, data node 554a maintains data store 556a and transaction log 557a, data node 554b maintains data store 556b and transaction log 557b, data node 554c maintains data store 556c and transaction log 557c, data node 554d maintains data store 556d and transaction log 557d.

Configuration node 502 stores cluster metadata 503 and configuration node 552 stores cluster metadata 553 that defines a replication group that includes data nodes in multiple data centers and includes information on the data nodes in a replication group, such as the identities and addresses of the data nodes and information about the data stores maintained by each data node. The cluster clients 520 can be configured to connect to configuration node 502 to discover the data nodes in data center 501 available to cluster clients 520 and data nodes in data center 501 can be configured to connect to configuration node 502 to discover the other data nodes in a cluster or replication group. The cluster clients 570 can be configured to connect to configuration node 552 to discover the data nodes in data center 550 available to cluster clients 570 and data nodes in data center 550 can be configured to connect to configuration node 552 to discover the other data nodes in a cluster or replication group.

The cluster metadata 503, 553 may define a replication group of data nodes in one or more clusters to maintain copies of a data set. A replication group comprises a master data node that maintains a master data set and the replica data nodes that maintain replica data sets. Changes to the master data set are replicated to the replica data sets. With multiple copies of the same data set on different data nodes in the cluster, the replication group provides a level of fault tolerance against the loss of a single data node. A replication group can provide increased query performance since the system can distribute the queries on the data set over different data nodes of the replication group.

In FIG. 5, for example, data nodes 504a, 504b, 504c, 504d, 504e, 504f, 504g, 554a, 554b, 554c, 554d are grouped in a replication group with data node 554a acting as the master data node and the others acting as replica data nodes. Thus, in FIG. 1, data store 506a is the master data store and data stores 506b, 506c, 506d, 506e, 506f, 506g, 556a, 556b, 556c, 556d are replica data stores. Each data node in the replication group can maintain a list of the other replica data nodes in the replication group and addressing information for the other data nodes in the replication group (e.g., based on cluster metadata provided by a configuration node 502, 552).

Prior to committing an update to a page to data store 506a, master data node 504a sends the transaction log record containing the update to replica data nodes 504b, 504c, 504d, 504e, 504f, 504g, 554a, 554b, 554c, 554d and waits for an acknowledgement. As discussed above, sending an update to the replica data nodes may include sending a log proposal to the replica data nodes, the log proposal including log records up to a specified log record (e.g., including log records up to a specified LSN). Master data node 504a is configured with an acknowledgement requirement that sets an acknowledgement threshold of replica data nodes in the replication group that must acknowledge the transaction log record. The acknowledgement requirement takes account of the fact that replica data nodes are spread across data centers. For example, the acknowledgement requirement may include a first threshold for the data nodes in the same data center as master data node 504*a*, but a second threshold for replica data nodes at other data centers. In the example of FIG. 5, quorum-1=3 for data center 501 and quorum-1=2 for data center 550, wherein the master data node 504*a* is considered part of each quorum. In this example then, the master data node 504*a* waits for acknowledgements from at least three of the replica nodes 504*b*, 504*c*, 504*d*, 504*e*, 504*f* and at least two of replica nodes 554*a*, 554*b*, 554*c*, 554*d* before committing an update.

According to one embodiment, master data node 504*a* delays completing commit processing of a transaction until the transaction is considered complete. Master data node 504*a* considers a transaction complete when at least all the update data necessary to redo the transaction has been persistently recorded by at least a first threshold number of data nodes 504*b*, 504*c*, 504*d*, 504*e*, 504*f*, 504*g* and at least a second threshold number of data nodes 554*a*, 554*b*, 554*c*, 554*d*. For example, master data node 504*a* may not consider a transaction complete until at least the first acknowledgement threshold number of replica data nodes 504*b*, 504*c*, 504*d*, 504*e*, 504*f*, 504*g* in the first cluster at data center 501 and at least the second acknowledgement threshold number of replica data nodes 554*a*, 554*b*, 554*c*, 554*d* in the second cluster at data center 550 have acknowledged the transaction log records at least up to the commit transaction log record for the transaction.

In an embodiment in which master data node 504*a* can write an updated page to master data store 506*a* before the transaction that modified the page commits, master data node 504*a* may delay writing the modified page to master data store 506*a* until all the update data necessary to redo or undo the modification is stored in the persistent transaction log records of at least the first threshold number of data nodes 504*b*, 504*c*, 504*d*, 504*e*, 504*f*, 504*g* and at least the second threshold number of data nodes 554*a*, 554*b*, 554*c*, 554*d*.

Master data node 504*a* thus ensures that on-going changes have been sufficiently replicated to clusters at data center 501 and data center 550 before committing changes to persistent data store 506*a*. Master data node 504*a*, however, does not have to unduly delay or suspend commit processing because of delays or failures at a small number of replica nodes. Master data node 504*a* and replica data nodes 504*b*, 504*c*, 504*d*, 504*e*, 504*f*, 504*g*, 554*a*, 554*b*, 554*c*, 554*d* may operate as discussed above.

In some embodiments, a master data node may be configured with multiple replication modes, each replication mode specifying an acknowledgement requirement. The master data node can apply different replication modes to different transactions. In some cases, the cluster client 120, 520, 570 can indicate the replication mode to apply to a transaction when submitting a transaction. Thus, the cluster client can specify an acknowledgement requirement on a per transaction basis. In addition, or in the alternative, a master data node can be configured with a default replication mode or rules to select a replication mode.

As an example, a master data node may be configured with an EACH_QUORUM mode according to which the master data node awaits acknowledgements from at least the acknowledgement threshold number of data nodes in each data center having data nodes in the replication group before completing commit processing, a LOCAL_QUORUM mode according to which the master data node waits for acknowledgements from at least the acknowledgement threshold number of data nodes in the data center of the master data node before completing commit processing or a ONE mode according to which the master data node does not require an acknowledgement of log proposal to complete commit processing. The client 120, 520, 570 specifies the replication mode for every transaction submitted by the client. For example, the default mode may be LOCAL_QUORUM, but the client can specify a higher or lower requirement for more critical or less critical transactions.

In this example, when master data node 104*a*, 504*a* processes a commit for a transaction that the cluster client 120, 520, 570 indicated should be committed according to an EACH_QUORUM replication mode, the master data node 104*a*, 504*a* delays completing commit processing of the transaction until the master data node receives acknowledgements of the log proposal containing the transaction log records for the transaction from at least the acknowledgement threshold of replica data nodes from each data center having data nodes in the replication group. Using the prior example of FIG. 5, for a transaction received by master data node 504*a* from a cluster client 520 and indicated for an EACH_QUORUM replication mode, master data node 504*a* waits for acknowledgements of the log proposal from at least three of the replica nodes 504*b*, 504*c*, 504*d*, 504*e*, 504*f* and at least two of replica nodes 554*a*, 554*b*, 554*c*, 554*d* before committing the transaction.

Continuing with the previous example, when master data node 104*a*, 504*a* processes a commit for a transaction that the cluster client 120, 520, 570 indicated should be committed according to a LOCAL_QUORUM replication mode, the master data node 104*a*, 504*a* delays completing commit processing of the transaction until the master data node receives acknowledgements of the log proposal containing the transaction log records for the transaction from at least the acknowledgement threshold of replica data nodes from the local data center. Using the prior example of FIG. 5, for a transaction indicated for an LOCAL_QUORUM replication mode received by master data node 504 from a cluster client 520, master data node 504*a* waits for acknowledgements from at least three of the replica nodes 504*b*, 504*c*, 504*d*, 504*e*, 504*f*, but does not wait for acknowledgements from the nodes of data center 550, before committing the transaction.

As another example, when master data node 104*a*, 504*a* processes a commit for a transaction that the cluster client 120, 520, 570 indicated should be committed according to a ONE replication mode, the master data node 104*a*, 504*a* commits the transaction once all the transaction log records for the transaction have been forced to the persistent transaction log 107*a*, 507*a*, but does not require acknowledgements from the replica data nodes.

Further, the master data node may be configured to apply one or more replication modes to log proposals sent based on internal events. For example, when WAL is initiated, the master data node 104*a*, 504*a* may send a log proposal to data nodes in a replication group and apply a LOCAL_QUORUM replication mode.

Figure 6:
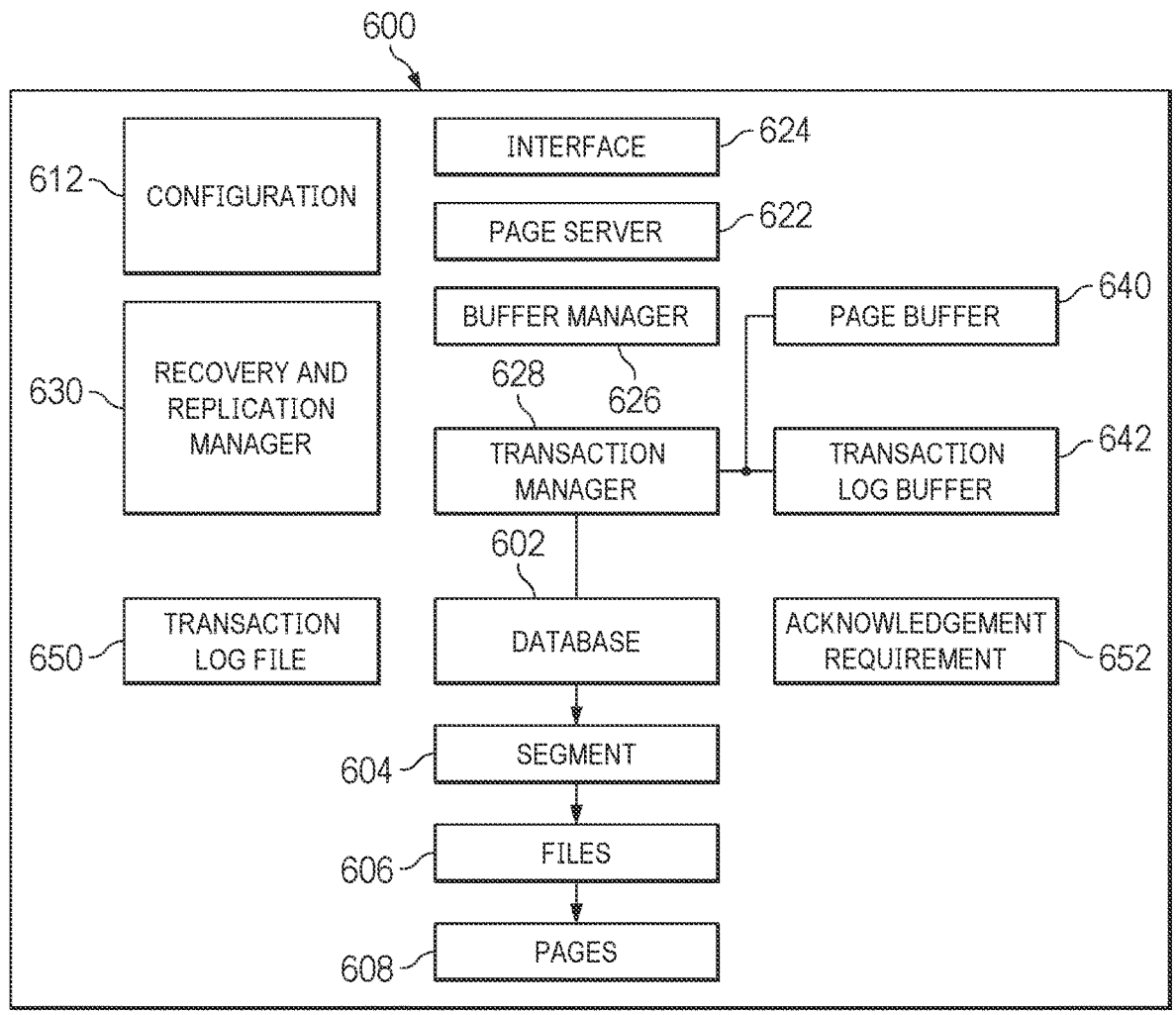
FIG. 6 illustrates one embodiment of a data node.

FIG. 6 is a diagrammatic representation of one embodiment of a data node 600 that can act as a master data node or replica data node. Data node 600 comprises a persistent database 602 that contains database objects, such as users, groups, libraries, documents, BLOBs, indexes, catalogs, metadata. A database library occupies one or more segments 604. Each segment 604 is a logical storage location within database 602. A segment can be spread physically over multiple files 606. Files contain data pages 608 that store data. A single file 606 can be spread over multiple data pages 608. According to one embodiment, each data page 608 is a fixed size block (e.g., 4K, 8K, or other size). Each page may include metadata, including the LSN for the last update to the page.

Data node 600 comprises a configuration component 612 that is configured to connect to a configuration node and access cluster metadata to determine if node 600 is a member of a replication group, the other members of the replication group, node 600's role in the replication group and an acknowledgement requirement 652.

Data node 600 further comprises page server 622 to transfer pages to client applications that process data locally. An interface 624, such as an API or other interface, can allow clients to specify transactions to update pages. A buffer manager 626 manages buffer pools in volatile memory, including managing page buffer 640 and transaction log buffer 642. Buffer manager does the input/output device (I/O) to read/write pages from/to persistent database 602 to a page buffer 640 in volatile memory and dirty pages from page buffer 640 to database 602. Buffer manager 626 can also allocate and manage volatile memory space for a transaction log buffer 642. Transaction manager 628 processes transactions from clients to update pages in page buffer 640 and logs transactions in transaction log buffer 642.

Buffer manager 626 and transaction manager 628 may make synchronization calls to recovery and replication manager 630. For example, buffer manager 626 may make a synchronization call when buffer manager 626 detects that transaction log buffer 642 is full and transaction manager 628 may make a synchronization call when it determines that it has reached a transaction commit. According to one embodiment, transaction manager 628 does not complete commit processing for a transaction at least until it receives a response from replication and recovery manager 630 that the transaction is complete.

In the master data node mode of operation, recovery and replication manager 630 can be configured to force logs to persistent transaction log file 650 at the occurrence of defined events, such as receiving a synchronization call. For example, recovery and replication manager 630 may force the log based on an indication from buffer manager 626 that transaction log buffer 642 is full or based on transaction manager 628 reaching a commit for a transaction.

Recovery and replication manager 630 can be configured to send log proposals to replica data nodes and determine if acknowledgements of a log proposal meet an acknowledgement requirement 652 before indicating to transaction manager 628 that a change can be committed to database 602 (e.g., before indicating that transaction manager 628 can update a page in database 602 or complete commit processing a transaction to update database 602). Recovery and replication manager 630 can also track a mLastAckLSN and implement master node recovery.

Further, at a master data node, recovery and replication manager 630 may receive recovery requests from replica data nodes, send recovery log proposals to replica data nodes and otherwise participate in replica recovery. Recovery and replication manager 630 can also implement master data node election and recovery. Recovery and replication manager 630 may further interact with transaction manager 628 during recovery to redo or undo changes in transaction log records of transaction log file 650.

In a replica data node mode of operation, recovery and replication manager 630 is configured to receive log proposals from a master data node, store the transaction log entries from the log proposals in transaction log file 550 and acknowledge the log proposals. Recovery and replication manager 630 may further track an rLastAckLSN and record the last received mLastAckLSN. Recovery and replication manager 630 can also implement replica data node recovery and master data node election. Recovery and replication manager component 630 may interact with transaction manager 628 during recovery to redo or undo changes in transaction log records from transaction log file 650.

Figure 7:
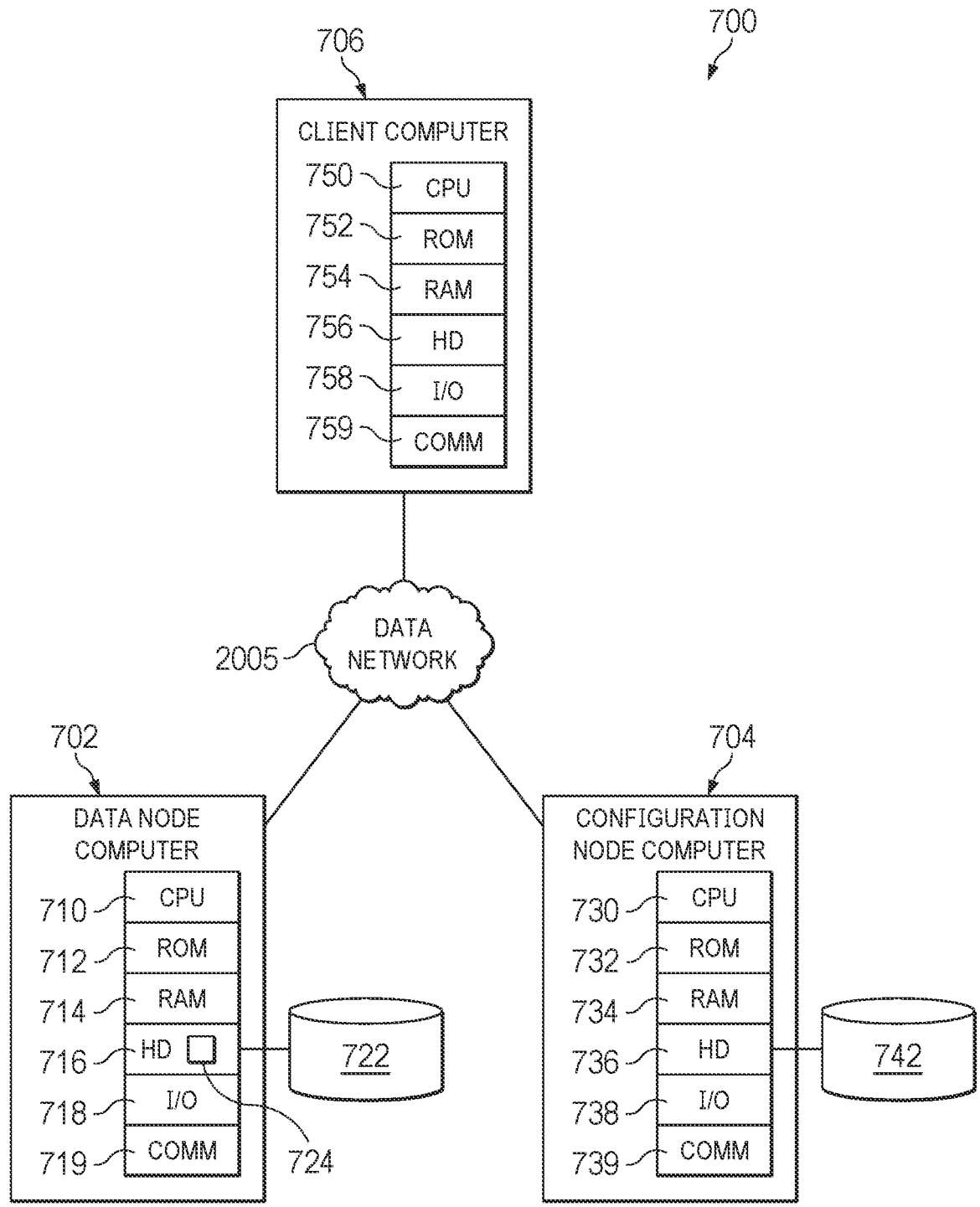
FIG. 7 illustrates one embodiment of a networked computer environment.

FIG. 7 is a diagrammatic representation of a distributed network computing environment 700 where embodiments disclosed herein can be implemented. In the example illustrated, network computing environment 700 includes a data network 705 that can be bi-directionally to data node computers 702, configuration node computers 704, and client computer 706. Network 705 may represent a combination of wired and wireless networks that network computing environment 700 may utilize for various types of network communications known to those skilled in the art. Data network 705 may be, for example, a WAN, LAN, the Internet or a combination thereof. Each computer 702, 704, 706 may comprise a plurality of computers interconnected to each other over network 705. For example, a plurality of computers 702, a plurality of computers 704 and a plurality of computers 706 may be interconnected over network 705.

Data node computer 702 can include central processing unit (CPU) 710, ROM 712, RAM 714, HD or storage memory 716, I/O 718 and communications interface 719. I/O 718 can include a keyboard, monitor, printer, electronic pointing device (e.g., mouse, trackball, stylus, etc.), or the like. Communications interface 719 may include a communications interface, such as a network interface card, to interface with network 705.

According to one embodiment, data node computer 702 may include computer executable instructions 724 stored on a non-transitory computer readable medium coupled to a processor. The computer executable instructions of computer 702 may be executable to provide a master data node, a replica data node or a standalone data node (a data node not in a replication group). Data node computer 702 can be configured to maintain a persistent data store 722, such as a database, file system or other data store, as a master data store, replica data store or standalone data store. Data node computer 702 can further maintain a persistent transaction log. A page buffer and transaction log buffer can be implemented in volatile RAM 714. A plurality of data node computers 702 may provide a cluster of data nodes. In other embodiments, a single computer may provide a plurality of data nodes. For example, a single computer may be configured as multiple virtual machines where each virtual machine provides a data node.

Configuration node computer 704 can comprise CPU 730, ROM 732, RAM 734, HD 736, I/O 738 and communications interface 739. I/O 738 can include a keyboard, monitor, printer, electronic pointing device (e.g., mouse, trackball, stylus, etc.), or the like. Communications interface 739 may include a communications interface, such as a network interface card, to interface with network 705. Configuration node computer 704 maintains metadata store 742 of cluster metadata. According to one embodiment, computer 704 may include computer executable instructions stored on a non-transitory computer readable medium coupled to a processor. The computer executable instructions of computer 704 may be executable to provide a configuration node for a cluster.

Computer 706 can comprise CPU 750, ROM 752, RAM 754, HD 756, I/O 758 and communications interface 759. I/O 758 can include a keyboard, monitor, printer, electronic pointing device (e.g., mouse, trackball, stylus, etc.), or the like. Communications interface 759 may include a communications interface, such as a network interface card, to interface with network 705. Computer 706 may comprise cluster client software configured to read from or write to data node computer 702 to update data store 722.

Each of the computers in FIG. 7 may have more than one CPU, ROM, RAM, HD, I/O, or other hardware components. For the sake of brevity, each computer is illustrated as having one of each of the hardware components, even if more than one is used. Each of the computers 702, 704, 706 is an example of a data processing system. ROM 712, 732, 752; RAM 714, 734, 754; HD 716, 736, 756; data store 722 and metadata store 742 can include media that can be read by 710, 730, 750. These memories may be internal or external to computers 702, 704, 706.

Portions of the methods described herein may be implemented in suitable software code that may reside within ROM 712, 732, 752; RAM 714, 734, 754; HD 716, 736, 756. In addition to those types of memories, the instructions in an embodiment disclosed herein may be contained on a data storage device with a different computer-readable storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method comprising:
    buffering a page in a page buffer of a master data node;
    storing a transaction log record for a transaction in a transaction log buffer of the master data node, the transaction log record including an update to data that describes a change to the page;
    responsive to a defined synchronization call, force the transaction log record from the transaction log buffer of the master data node to a master node transaction log for recording changes to a master database, the transaction log record comprising an update to data in the master database that has not been committed to the master database;
    sending, to a plurality of replica data nodes, the transaction log record comprising the update to data in the master database that has not been committed to the master database;
    receiving acknowledgements of the transaction log record at the master data node;
    determining that the received acknowledgements of the transaction log record meet an acknowledgement requirement that comprises an acknowledgement threshold that is less than a total number of replica data nodes in the plurality of replica data nodes; and
    setting, by the master data node, the transaction log record as a master node last acknowledged transaction log record in the master node transaction log based on a determination that the received acknowledgements of the transaction log record meet the acknowledgement requirement.

2. The method of claim 1, wherein the plurality of replica data nodes comprises data nodes at a plurality of data centers.

3. The method of claim 2, wherein the plurality of replica data nodes comprises data nodes in a plurality of clusters.

4. The method of claim 2, wherein the acknowledgement threshold comprises a first acknowledgement threshold and a second acknowledgement threshold, and wherein the method further comprises:
    determining that the received acknowledgements of the transaction log record include:
        acknowledgements of the transaction log record from replica data nodes at a first data center that meet the first acknowledgement threshold; and
        acknowledgements of the transaction log record from replica data nodes at a second data center that meet the second acknowledgement threshold; and
    determining that the received acknowledgements of the transaction log record meet the acknowledgement requirement based on a determination that the received acknowledgements of the transaction log record include acknowledgements of the transaction log record from replica data nodes at the first data center that meet the first acknowledgement threshold and acknowledgements of the transaction log record from replica data nodes at that second data center that meet the second acknowledgement threshold.

5. The method of claim 1, further comprising determining that the received acknowledgements of the transaction log record meet the acknowledgement requirement based on a determination that the received acknowledgements of the transaction log record include replica data node acknowledgement of the transaction log record from at least the acknowledgement threshold of replica data nodes from the plurality of replica data nodes.

6. The method of claim 1, wherein the master node last acknowledged transaction log record indicates a last redo transaction log record for startup recovery.

7. The method of claim 1, further comprising sending an identification of the master node last acknowledged transaction log record to the plurality of replica data nodes.

8. The method of claim 1, further comprising receiving, by the master data node, a recovery request from a replica data node of the plurality of replica data nodes for a set of transaction log records subsequent to a replica data node last acknowledged transaction log record for the replica data node.

9. The method of claim 8, wherein the set of transaction log records comprises transaction log records from the replica data node last acknowledged transaction log record for the replica data node to the master node last acknowledged transaction log record.

10. The method of claim 1, further comprising:
maintaining the master node transaction log in persistent memory of the master data node;
writing the transaction log record from master data node volatile memory to the master node transaction log in a persistent memory; and
sending the transaction log record to the plurality of replica data nodes after writing the transaction log record to the master node transaction log in the persistent memory.

11. The method of claim 10, further comprising:
responding to the defined synchronization call based on receiving the acknowledgements of the transaction log record from at least the acknowledgement threshold of replica data nodes of the plurality of replica data nodes.

12. The method of claim 1, wherein the defined synchronization call includes a signal from a buffer manager that the transaction log buffer of the master data node is full.

13. The method of claim 1, further comprising, based on detecting that the master data node has failed, electing a new master data node from the plurality of replica data nodes.

14. A database replication system comprising:
a plurality of replica data nodes each comprising a replica database; and
a first master data node comprising:
a page buffer;
a master database;
a transaction log buffer;
a master node transaction log for recording changes to the master database;
an acknowledgement requirement that comprises an acknowledgement threshold that is less than a total number of replica data nodes in the plurality of replica data nodes;
a first memory storing computer executable instructions executable to:
buffer a page in the page buffer;
store a transaction log record for a transaction in the transaction log buffer, the transaction log record including update data that describes a change to the page;
responsive to a defined synchronization call, force the transaction log record from the transaction log buffer to the master node transaction log;
send to the plurality of replica data nodes the transaction log record, wherein the transaction log record includes an update to data in the master database that has not been committed to the master database;
receive acknowledgements of the transaction log record;
determine that the received acknowledgements of the transaction log record meet the acknowledgement requirement; and
based on a determination that the received acknowledgements of the transaction log record meet the acknowledgement requirement, set the transaction log record as a master node last acknowledged transaction log record in the master node transaction log.

15. The database replication system of claim 14, wherein the plurality of replica data nodes are located at a plurality of data centers.

16. The database replication system of claim 15, wherein the plurality of replica data nodes comprises data nodes in a plurality of clusters.

17. The database replication system of claim 15, wherein:
the acknowledgement threshold comprises:
a first acknowledgement threshold; and
a second acknowledgement threshold; and
the computer executable instructions further comprise instructions executable to:
determine that the received acknowledgements of the transaction log record meet the acknowledgement requirement;
determine that that the received acknowledgements of the transaction log record include acknowledgements of the transaction log record from replica data nodes at a first data center that meet the first acknowledgement threshold;
determine that the acknowledgements of the transaction log record from replica data nodes at a second data center that meet the second acknowledgement threshold.

18. The database replication system of claim 14, wherein the first master data node is configured to determine that the received acknowledgements of the transaction log record meet the acknowledgement requirement based on a determination that the received acknowledgements of the transaction log record include replica data node acknowledgements of the transaction log record from at least the acknowledgement threshold of replica data nodes from the plurality of replica data nodes.

19. The database replication system of claim 14, wherein the master node last acknowledged transaction log record indicates a last redo transaction log record for startup recovery.

20. The database replication system of claim 14, wherein the first master data node is further configured to send an identification of the master node last acknowledged transaction log record to the plurality of replica data nodes.

21. The database replication system of claim 14:
wherein the first master data node comprises:
- a persistent memory; and
- a master data node volatile memory; and wherein the computer executable instructions further comprise instructions executable to:
- maintain the transaction log buffer in the master data node volatile memory;
- maintain the master node transaction log in the persistent memory;
- write the transaction log record from the master data node volatile memory to the master node transaction log in the persistent memory;
- send the transaction log record to the plurality of replica data nodes after writing the transaction log record to the master node transaction log in persistent memory; and
- respond to the defined synchronization call based on receiving the acknowledgements of the transaction log record from at least the acknowledgement threshold of replica data nodes of the plurality of replica data nodes.

* * * * *